(12) United States Patent
Litman et al.

(10) Patent No.: US 7,717,423 B2
(45) Date of Patent: May 18, 2010

(54) DUPLEX ADF MECHANISM

(75) Inventors: Matthew Jeremy Litman, Lexington, KY (US); Robert Warren Rumford, Lexington, KY (US); Donald N. Spitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 200 days.

(21) Appl. No.: 11/862,530

(22) Filed: Sep. 27, 2007

(65) Prior Publication Data

US 2009/0085280 A1    Apr. 2, 2009

(51) Int. Cl.
*B65H 5/02* (2006.01)
(52) U.S. Cl. .................... 271/273; 271/3.14; 271/225; 399/374
(58) Field of Classification Search ........... 271/273, 271/274, 225, 902, 314, 3.14; 399/367, 374
See application file for complete search history.

(56) References Cited

U.S. PATENT DOCUMENTS

| | | | | | |
|---|---|---|---|---|---|
| 4,456,237 | A | * | 6/1984 | Buddendeck | 271/3.05 |
| 4,579,444 | A | * | 4/1986 | Pinckney et al. | 399/372 |
| 5,132,742 | A | * | 7/1992 | Goto | 399/401 |
| 5,570,877 | A | * | 11/1996 | Asami et al. | 271/186 |
| 5,926,681 | A | * | 7/1999 | Ishimaru | 399/367 |
| 6,009,303 | A | * | 12/1999 | Kumagai et al. | 399/370 |
| 6,161,831 | A | * | 12/2000 | Kusakabe et al. | 271/186 |
| 6,354,589 | B1 | * | 3/2002 | Taruki et al. | 271/265.01 |
| 6,393,251 | B2 | * | 5/2002 | Kono | 399/370 |
| 6,434,359 | B2 | * | 8/2002 | Nose et al. | 399/374 |
| 7,055,949 | B2 | * | 6/2006 | Ohashi | 347/104 |
| 7,495,810 | B2 | * | 2/2009 | Shiraishi | 358/474 |
| 2002/0071702 | A1 | * | 6/2002 | Nose et al. | 399/374 |
| 2003/0227654 | A1 | * | 12/2003 | Shiraishi | 358/474 |
| 2006/0180971 | A1 | * | 8/2006 | Maruyama | 271/3.14 |
| 2007/0065197 | A1 | * | 3/2007 | Tanaka | 399/374 |
| 2007/0081212 | A1 | * | 4/2007 | Tonami et al. | 359/197 |

* cited by examiner

*Primary Examiner*—Patrick H Mackey
*Assistant Examiner*—Jeremy Severson

(57) ABSTRACT

An duplex auto-document feed mechanism comprises an auto-document feedpath having a simplex feedpath portion and a duplexing feedpath portion in feeding communication with the simplex feedpath portion, the auto-document feedpath has a media input and a media output, an input roller for feeding media disposed at the media input and an exit nip positioned near the media output, a motor driving the input roller and the exit nip, a scanning station disposed along one of the duplex feedpath portion and the simplex feedpath portion, the exit nip having a first position wherein first and second rollers defining the exit nip are closed when receiving media during a simplex feeding procedure and open when a leading edge and trailing edge of media are passing through the exit nip simultaneously, wherein a change of motor direction one of opens the exit nip or closes the exit nip.

14 Claims, 18 Drawing Sheets

DUPLEX ADF MECHANISM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to an auto-document feeder for a peripheral device. More particularly, the present invention relates to a document scanner having duplex feeding capability.

2. Description of the Related Art

Printers, scanners, copiers, facsimile devices, and combinations thereof, including but not limited to, all-in-one or multi-function peripherals are being designed more frequently to perform duplex document feeding. Such feeding functionality allows for documents to be scanned from and/or printed on both sides of the document.

Inclusion of duplexing functionality is known within business class peripherals, which are typically of a larger size and therefore able to accommodate structure to perform duplex functions. However one problem with implementing this functionality into consumer devices is the limited product size of consumer peripherals. When including duplexing capability into a consumer peripheral, the device must be large enough to accommodate a media sheet of suitable size for feeding both through a simplex path and a duplex path.

In order to accommodate duplexing functionality into a consumer sized auto-document feeder, a duplexing path has been designed to be shorter than the length of a media sheet. In this feedpath configuration, a media leading edge and trailing edge may pass through a single nip at the same time. It is desirable that such simultaneous passing of the leading edge and trailing edge of a media sheet through a single nip not cause scanning or feeding defects which lead to decreased scan quality output from the device or print feed quality which is decreased. In addition, it is desirable that a duplex feeding device have the capability of feeding various media sizes. Some prior art duplex devices rely on gear timing to in order allow duplex feeding. However, where functions are merely timed during feeding control is lost and ability to feed multiple media sizes is inhibited.

SUMMARY OF THE INVENTION

An duplex auto-document feed mechanism comprises an auto-document feedpath having a simplex feedpath portion and a duplexing feedpath portion in feeding communication with the simplex feedpath portion, the auto-document feedpath having a media input and a media output, an input roller for feeding media disposed at the media input and an exit nip positioned near the media output, a motor driving the input roller and the exit nip, and, a scanning station disposed along one of the duplex feedpath portion and the simplex feedpath portion, the exit nip having a first position wherein first and second rollers defining the exit nip are closed when receiving media during a simplex feeding procedure and open when a leading edge and trailing edge of media are passing through the exit nip simultaneously, wherein a change of motor direction one of opens the exit nip or closes the exit nip. The duplex auto-document feeding mechanism further comprises a cam assembly opening the exit nip and closing the exit nip. The duplex auto-document feeding mechanism further comprises an idler housing, one of the first and second rollers rotatably connected to the idler housing. The duplex auto-document feeding mechanism wherein the idler housing is pivotally connected within the auto-document feed mechanism for pivotal motion away from the other of the first and second rollers. The duplex auto-document feeding mechanism further comprises a two-stage clutch mechanism. The duplex auto-document feeding mechanism further comprises a frame and a pawl pivotally connect to the frame. The duplex auto-document feeding mechanism wherein the two stage clutch assembly either engages or disengages an auto-compensating mechanism input gear based on a rotation of the motor. The duplex auto-document feeding mechanism further comprises a delivery drive roller disposed between the scanning station and the exit nip. The duplex auto-document feeding mechanism further comprises two two-stage clutches to actuate the input roller and the exit nip. The duplex auto-document feeding mechanism further comprises multiple jogs to actuate the two two-stage clutches.

A duplex feed mechanism comprises an auto-document feedpath having an input, an output, a simplex portion and a duplex portion, a motor driving a plurality of rollers within the auto-document feedpath, the plurality of rollers including an exit nip roll and a corresponding exit nip idler, one of the exit nip rollers having a first position wherein the nip is substantially closed and a second position where the nip is open, the exit nip idler being movable by a cam, the cam being actuated by changing direction of the motor, and, a duplex delivery nip disposed within the duplex portion of the auto-document feedpath. The duplex feed mechanism wherein the duplex delivery nip is positioned between a final exit nip and a scan index nip along the auto-document feedpath portion. The duplex feed mechanism further comprises a drive roller in feeding cooperation with a duplex delivery idler at a first location and an exit delivery idler at a second location. The duplex delivery idler is moveable from a first position engaging the drive roller to a second position disengaged from the drive roller. The duplex delivery idler is moved by a cam assembly or the duplex delivery idler is moved by a two-stage clutch mechanism.

A duplex auto-document feed mechanism comprises an auto-document feedpath including a first simplex portion and a second duplex portion, an exit nip having a first roller and a second roller, one of the first roller and the second roller moveable from a first position to a second position during a direction change of a motor, the duplex feedpath being shorter than a length of media so that the first and second rollers are spaced apart when a leading edge and a trailing edge are positioned within the exit nip, wherein the first and second rollers are closed when receiving media from a simplex media feed and open during a duplex media feed. The duplex auto-document feed mechanism further comprises a cam assembly for opening and closing the exit nip. The cam assembly further comprises an idler roller rotatably connected to an arm. The duplex auto-document feed mechanism further comprises a cam rotatable to a first stop to open the exit nip and reversibly rotatable to a second stop to close the exit nip. The duplex auto-document feed mechanism further comprises a two-stage clutch mechanism for actuating a pick mechanism.

The duplex auto-document feed mechanism further comprises a delivery drive roll, a duplex delivery idler in operable communication with the delivery drive roll and an exit delivery idler in operable communication with the delivery drive roll. The duplex auto-document feed mechanism further comprises a duplex delivery nip and an exit delivery nip.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
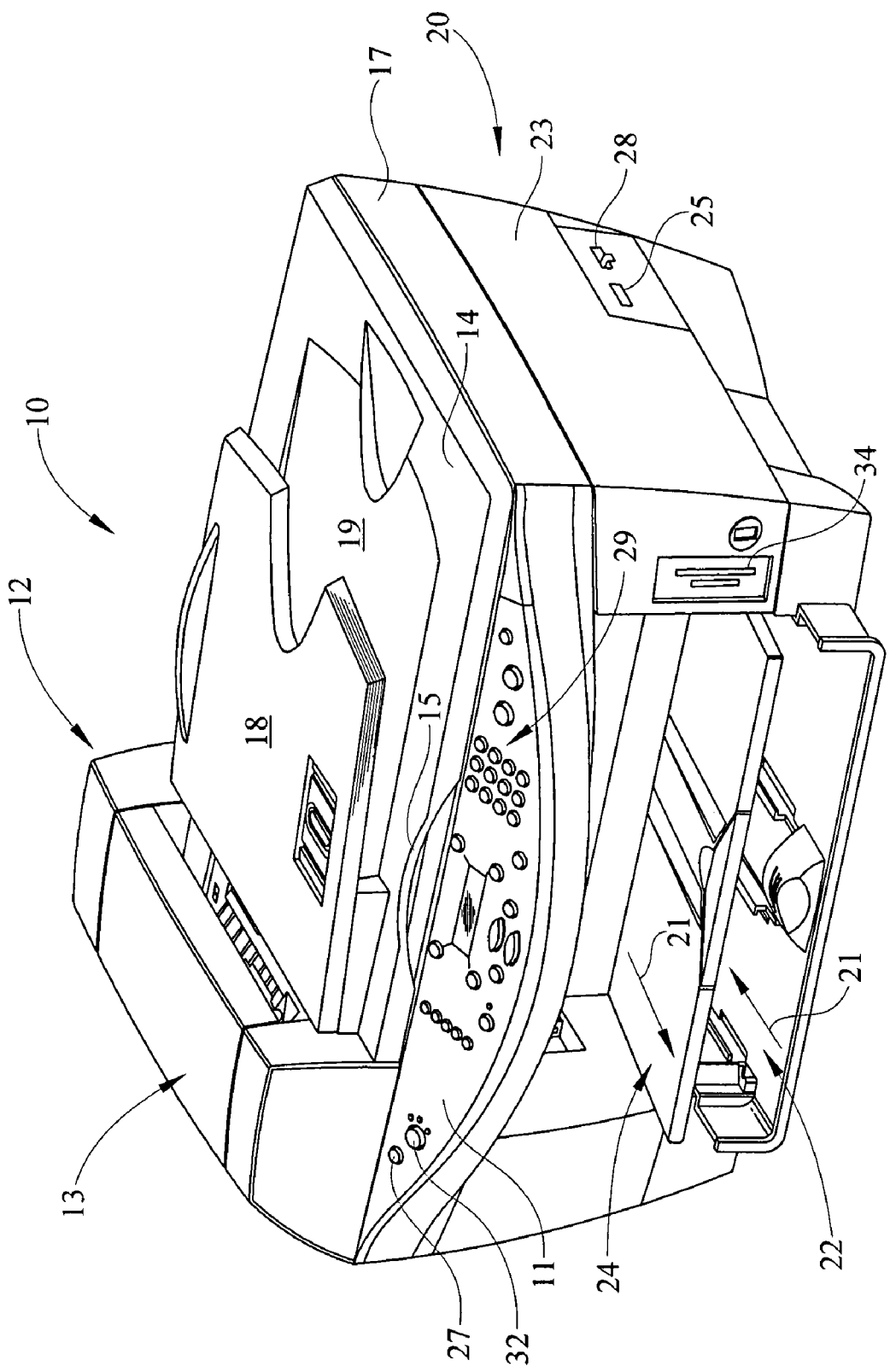
FIG. 1 is a perspective view of an exemplary multifunction peripheral or all-in-one device.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The term image as used herein encompasses any printed or digital form of text, graphic, or combination thereof. It should be understood that any target document or image may be scanned and manipulated, however for purpose of this description the term "image" will be used throughout. The term output as used herein encompasses output from any printing device such as color and black-and-white copiers, color and black-and-white printers, scanning device or so-called "all-in-one devices" or "multi-function peripherals" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output. The term ADF as used herein means auto-document feeder and may be utilized on printers, copiers, scanners, combinations thereof, multi-function peripheral devices and other such devices utilizing automated media feeding.

Referring now in detail to the drawings, wherein like numerals indicate like elements throughout the several views, there are shown in FIGS. 1-14 various aspects of a duplexing auto-document feeder. The duplexing mechanism of the present description provides a compact auto-document feed design which may be utilized within the general size constraints known to consumer peripheral devices while allowing feeding of multiple media sizes. Nevertheless, it should be understood that it is equally applicable to other machines which utilize media sheet feeding mechanisms such as printers, copiers, fax machines, auto-document feeding scanner devices or other mechanisms utilizing such sheet feeding devices for feeding both light and heavy weight media.

Referring initially to FIG. 1, an all-in-one device 10 is shown having an upper auto-document feeding (ADF) scanner portion 12 and a lower printer portion 20, packaged within a housing or cover set 23. Although the all-in-one device 10 is shown and described herein, one of ordinary skill in the art will understand upon reading of the instant specification that the present invention may be utilized with a stand alone printer, copier, scanner or other peripheral device utilizing a media feed system.

Extending from the printer portion 20 is an input tray 22 and an exit tray 24 at the front of the device 10 for retaining media before and after a print process, respectively. The input and output trays 22, 24 of the printer portion 20 define start and end positions of a media printing feedpath 21 through the printer portion 20. The trays 22,24 of the present embodiment are shown as being fixed however it is within the scope of the present description that such trays be telescoping for slidable extension during printing or slidable retraction into a nested configuration when not in use. The media trays 22,24 each retain a preselected number of sheets defining a stack of media (not shown) which will vary in height based on the media type. Although the lower tray 22 is an input tray and the upper tray 24 is an output tray, it is well within the ambit of one of ordinary skill in the art that the input tray 22 and the output tray 24 could be reversed to make the printing feedpath move from top to bottom. Further, one skilled in the art will understand that the media feedpath 21 is a C-path media feed due to the depicted configuration but alternatively could be formed as an L-shaped feedpath.

For ease of description and clarity, the exemplary printer portion 20 is an inkjet printing device, although other types of printing mechanisms may be utilized such as dye-sublimation, ink-jet printing mechanism or laser printing and therefore should not be considered limiting. And, although not shown specifically, the following general description of printing components will be understood by one of ordinary skill as parts relating to an inkjet printer. The printing portion 20 may include a carriage having a position for placement of at least one print cartridge. In the situation where two print cartridges are utilized, for instance, a color cartridge for photos and a black cartridge for text printing may be positioned in the carriage. As one skilled in the art will recognize, the color cartridge may include three inks, i.e., cyan, magenta and yellow inks. Alternatively, in lower cost machines, a single cartridge may be utilized wherein the three inks, i.e., cyan, magenta and yellow inks are simultaneously utilized to provide the black for text printing or for photo printing. Alternatively, a single black color cartridge may be used. During advancement, media moves from the input tray 22 to the output tray 24 through the substantially C-shaped media feedpath 21 beneath the carriage and cartridge (not shown). As the media M moves into a printing zone, beneath the at least one ink cartridge, the media M moves in a first direction as depicted and the carriage and the cartridges move in a second direction which is transverse to the movement of the media. During this movement, ink droplets are selectively ejected on to the media indexing through the feedpath 21 to form an image.

Referring still to FIG. 1, the scanner portion 12 of all-in-one device 10 generally includes an auto-document feeding (ADF) scanner 13, a scanner bed 17 and a lid 14 which is hingedly connected to the scanner bed 17 by way of the housing 23 or a frame therein. The ADF scanner 13 is rigidly connected to the housing 14. Beneath the lid 14, and within the scanner bed 17, is a transparent platen (not shown) for placement and support of target or original documents for manually flatbed scanning. Along a front edge of the lid 14 is a handle 15 for opening of the lid 14 and placement of the target document on the transparent platen. Adjacent the lid 14 is an exemplary duplexing ADF scanner 13 which automatically feeds and scans stacks of documents which are normally sized, e.g. letter, legal, or A4, and better suited for automatic feeding. Above the lid 14 and adjacent an opening in the ADF scanner 13 is an ADF input tray 18 which supports a stack of target media or documents for feeding through the auto-document feeder 13. Beneath the input tray 18, the upper surface of the lid 14 also functions as an output tray 19 for receiving documents fed through the ADF scanner 13.

Referring still to FIG. 1, the front surface of the peripheral device 10 comprises a control panel 11 for controlling the various functions and connectivities of the multi-function peripheral device 10. The control panel 11 may comprise a plurality of buttons 29 for making command selections or correction of error conditions. The control panel 11 may include a graphics display to provide a user with information such as menus, choices or errors occurring with the system. A device controller (not shown) is utilized to receive inputs and commands, and signals the various components of the device 10. The controller may be embodied, for example, by a microprocessor or the like. The device controller receives commands from selections made at plurality of control buttons 29 and accordingly operates appropriate components of the device 10, such as the printer 20, scanner 12 or the components described herein. Alternatively, the device 10 may receive commands from a computer connected to the device 10. Adjacent the indicator on the control panel 11 may be a power indicator 27 which may notify a user that the power on the peripheral device 10 is either connected, turned on or turned off. An LED light or other such luminaire may be utilized to as the indicator 27. Further, the LED may flash or have preselected illumination patterns or sequences to indicate different conditions, such as, for example an empty media input tray, printing error, media feed jam or the like. Additionally, the peripheral 10 may also use audible signals to indicate error conditions, corrections, decisions necessary or the like.

Disposed on at least one side surface of the peripheral device 10 are a plurality of connective structures which may be connected to a controller (not shown) on-board the device 10. The structures may include a universal serial bus (USB) connector 25. USB is a serial bus standard to interface peripheral devices, such as the peripheral device 10, and is designed to allow peripherals to be connected using a single standardized interface socket. USB also improves plug-and-play capabilities by allowing devices to be connected and disconnected without rebooting the computer (hot swapping). Other convenient features include powering low-consumption devices without the need for an external power supply and allowing some devices to be used without requiring individual device drivers to be installed. The peripheral 10 may be connected to a CPU (not shown) or USB hub for utilizing the printing and scanning functions of the multi-function peripheral device 10.

The all-in-one peripheral device 10 may also comprise a plurality of additional connective structures. For example, an Ethernet or local area network (LAN) connector 28, commonly known as a RJ-45 connector allows wired network communication for printing, scanning, faxing or other such functionality over a network. The term Ethernet refers to the family of local-area network (LAN) products covered by the IEEE 802.3 standard. Three data rates are currently defined for operation over optical fiber and twisted-pair cables: 10 Mbps—10Base-T Ethernet, 100 Mbps—Fast Ethernet and 1000 Mbps—Gigabit Ethernet. The Ethernet connector 28 may be a 10/100/1000 Ethernet connection utilized to connect the peripheral device 10 to a LAN which allows access to the printing functionality of the device 10 over a network infrastructure.

Likewise, the peripheral device 10 may comprise wireless connectivity for connection to wireless networks allowing wireless printing, scanning or other functionality from multiple computers on a network. Wireless-Fidelity (Wi-Fi) networks use radio technologies called IEEE 802.11a, 802.11b or 802.11g to provide secure, reliable, fast wireless connectivity. A Wi-Fi network can be used to connect computers to each other, to the Internet, and to wired networks (which use IEEE 802.3 or Ethernet). Wi-Fi networks operate in the 2.4 and 5 GHz radio bands, with an 11 Mbps (802.11b) or 54 Mbps (802.11a/g) data rate or with products that contain both bands (dual band). Alternatively, the wireless connectivity may allow operation in the 802.11n band which is designed to provide increased communications speeds and allows multiple input multiple out operation. These Wi-Fi network connections provide real-world performance similar to the basic 10BaseT wired Ethernet networks. In the exemplary embodiment, the wireless connectivity may operate through known standards IEEE 802.11a/b/g. This allows the peripheral device 10 to be wirelessly connected to the network. Although such structure is not shown, one skilled in the art will understand such implementation with the device 10. Near the upper left corner of the control panel 11 is a Wi-Fi indicator 32 which notifies a user that the Wi-Fi connectivity is enabled allowing the peripheral device 10 to connect to a wireless network.

The device 10 may also utilize Bluetooth technology to communicate with other peripheral devices, such as, for example, handheld digital cameras or camera-phones (not shown) in order to, for example, transfer pictures from the camera to the device 10 for printing on the printer portion 20. Bluetooth wireless technology is a short-range communications technology intended to replace the cables connecting portable and/or fixed devices while maintaining high levels of security. The Bluetooth specification defines a uniform structure for a wide range of devices to connect and communicate with each other. Bluetooth enabled electronic devices connect and communicate wirelessly through short-range, ad hoc networks, which are established dynamically and automatically as Bluetooth enabled devices enter and leave radio proximity. The device 10 may comprise, for example, a blue light indicating the Bluetooth communication system is either on or off. Alternatively, the indicator 32 may change to a blue color indicating the Bluetooth communication system is operating.

Additionally, the all-in-one device 10 may comprise a memory card reader station 34. The memory card reader station 34 is depicted adjacent the control panel 11. The memory card reader 34 receives various types of memory cards which may store picture files for printing or other manipulation by the device 10. These include USB flash drives, Secure Digital (SD) cards, micro SD cards, Sony® memory stick devices and the like. The media card reader station 34 receives various media types having images located thereon desired for printing. The images may be displayed on a peripheral device monitor or a monitor connected to a personal or networked computer (not shown) and may subsequently be edited or formatted as desired and printed through printer portion 20, saved to memory card at reader 34, to a computer or to a network storage device (not shown).

Referring still to FIG. 1, the peripheral 10 is depicted with scanning structure 12 including an ADF scanner 13 and a generally depicted flatbed scanner 17. With regard to the ADF scanner 13, the trays 18,19 define start and end points of the target document feedpath 40. According to the exemplary embodiment, the feedpath 40 has duplex feeding functionality, which is described further herein. The target documents feed through the target document feedpath 40 and past a scanbar which digitizes the image(s) of the target document. The scanbar, for example, may generally be either an optical reduction type using a combination of lens, mirror and a CCD (Charge Coupled Device) array or CIS (Contact Image Sensors) array. The CCD array is a collection of tiny, light-sensitive diodes, which convert photons into electrons. These diodes are called photosites—the brighter the light that hits a single photosite, the greater the electrical charge that will accumulate at that site. The image of the document that is scanned using a light source such as a fluorescent bulb reaches the CCD array through a series of mirrors, filters and lenses. The exact configuration of these components will depend on the model of scanner. Some optical reduction scanners use a three pass scanning method. Each pass uses a different color filter (red, green or blue) between the lens and CCD array. After the three passes are completed, the scanner software assembles the three filtered images into a single full-color image. Most optical reduction scanners use the single pass method. The lens splits the image into three smaller versions of the original. Each smaller version passes through a color filter (either red, green or blue) onto a discrete section of the CCD array. The scanner software combines the data from the three parts of the CCD array into a single full-color image.

Alternatively, for less expensive flatbed scanners and those with size limitations, contact image sensors (CIS) are used in the scanbar (not shown). CIS arrays replaces the CCD array, mirrors, filters, lamp and lens with an array of red, green and blue light emitting diodes (LEDs) and a corresponding array of phototransistors. The image sensor array consisting of 600, 1200, 2400 or 4800 LEDs and phototransistors per inch (depending on resolution) spans the width of the scan area and is placed very close to the glass plate upon which rest the image to be scanned. Another version of the CIS used a single set of red, green and blue LEDs in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most optical reduction scanners. Color scanning is done by illuminating each color type of LED separately and then combining the three scans.

Figure 2:
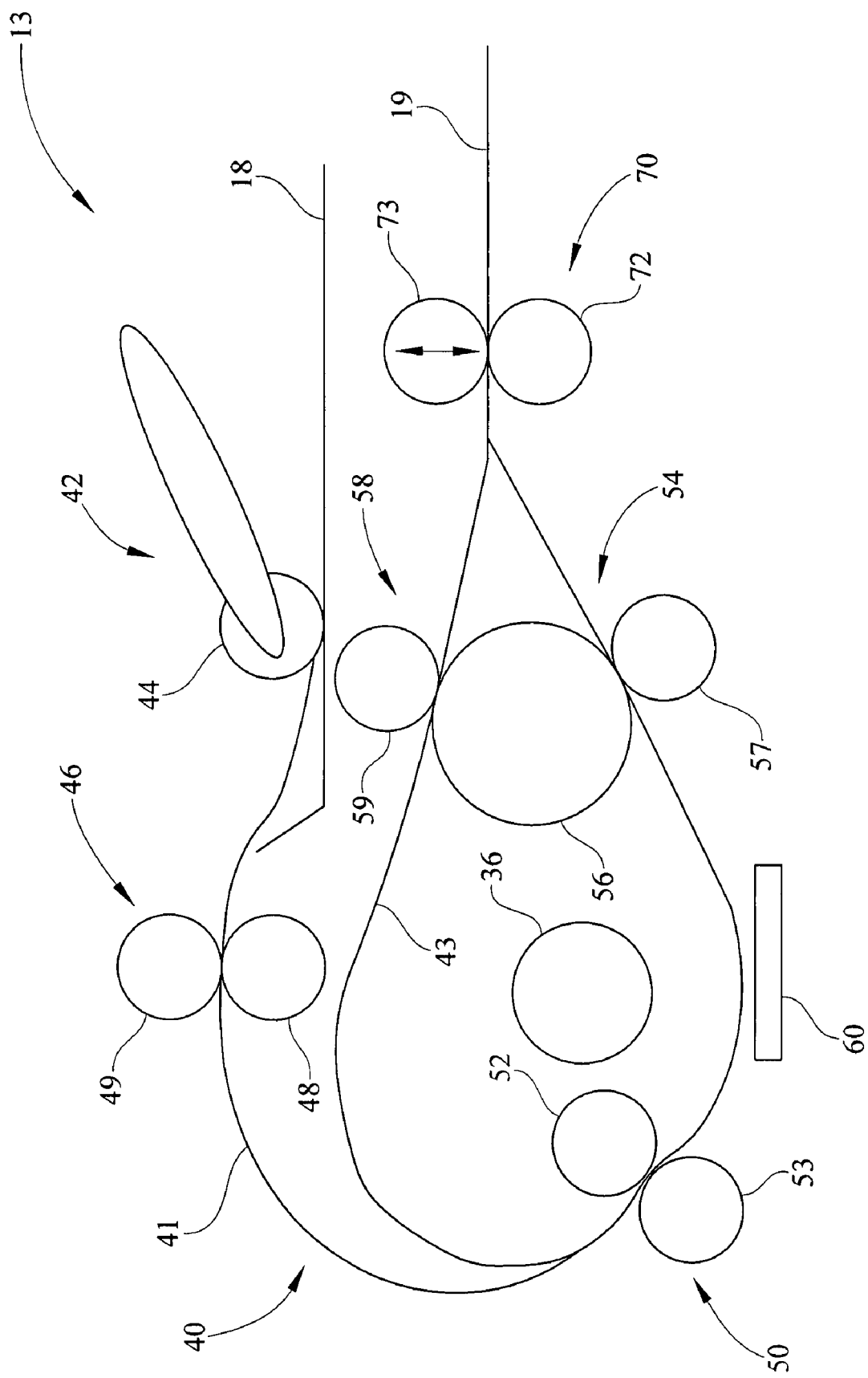
FIG. 2 is a schematic view of a feedpath for an auto-document feeder.

Referring now to FIGS. 1 and 2, the ADF scanner 13 feeds and scans stacks of documents which are normally sized, e.g. letter, legal, A4 or smaller media, and thus suitable for automatic feeding. When utilizing the ADF scanner 13, the target media is generally supported by tray 18. After passing through the ADF scanner 13, the media is then supported by the tray 19 until the entire process is complete when the all of the media has passed through the ADF scanner 13. A user may remove the media from tray 19 when the scanning process is completed. Further, the ADF scanner 13 is depicted as a C-path device with an upper media input 18 and a lower media output 19 however, the feedpath 40 (FIG. 2) may alternatively utilize an upper output and a lower input. As the media is input through the ADF scanner 13 along the feedpath 40, the media moves over a window (not shown). Beneath the window and with in the scanner bed 17 is an optical scanner or scanbar 60. As the target media or document passes over the window, the scanbar 60 captures the target image from the document passing there through. The scanbar 60 may be positioned at a home position when the scanbar 60 is positioned at the window. The scanbar 60 successively scans the media moving through the arcuate shaped feedpath 40.

Referring now to FIG. 2, a side schematic view of the ADF scanner 13 is depicted with the housing removed. The ADF 13 comprises the ADF scanner feedpath 40 extending from the input tray 18 to the output tray 19. The ADF scanner feedpath 40 comprises a simplex feedpath portion 41 and a duplex feedpath portion 43 which are in feeding communication with each other and with the input and output trays 18,19. In ADF scanning operation, media feeds through the simplex portion 41 for scanning of a first side of the media, then through the duplex portion 43 for scanning of a second side of the media by the scanbar 60, if such is desired. Finally the media is indexed to the output tray 19.

Near the input tray 18 is a media pick mechanism 42 which may be an auto-compensating mechanism (ACM) or other such media feed device. ACM devices are known to those skilled in the art and need not be described further herein. The media pick 42 comprises at least one media pick roller 44 which feeds media from the input tray 18 to a feed nip 46. The feed nip 46 comprises a feed drive roller 48 and a feed idler 49. The feed idler 49 may be biased to maintain contact between the roller 48 and idler 49. The feed drive roller 48 is connected by gear transmission to a motor 36 which rotates the roller 48 and thereby continues feeding of the media through the feedpath 40, specifically the simplex portion 41. Continuing in the feeding direction downstream of the feed nip 46 is a scanner feed nip or a scanner index nip 50. The scanner index nip 50 comprises a scanner index drive roller 52 and a scanner index idler 53. The index idler 53 may be biased to maintain contact with the drive roller 52. Like the feed drive roller 48, the scanner index drive roller 52 is also operably connected to the motor 36 by a gear transmission. Downstream of the scanner index nip 50, is the scanbar 60 which captures an image from a target document passing through the feedpath 40 above. Downstream of the scanbar 60 is an exit delivery nip 54. The exit delivery nip 54 comprises a delivery drive roller 56 which is operably connected to the motor 36 by gear transmission or the like. Opposite the delivery drive roller 56 is an idler roller 57 defining the nip 54 through which media passes. Downstream of the exit delivery nip 54 is a final exit nip 70. The final exit nip 70 comprises an exit drive roller 72 which is operably connected to the motor 36 by gear transmission and an opposed exit idler 73. A double-headed arrow on exit idler 73 indicates that the idler is movable toward and away from the exit drive roller 72 to open or close the nip 70. The final exit nip 70 delivers media to the output tray 19 adjacent thereto.

The exit drive roller 72 is also reversible to feed media to the duplex feedpath portion 43. The delivery drive roller 56 also defines, in part, a duplex delivery nip 58 which receives media from the final exit nip 70 when the exit drive roller 72 is reversed. During such reversal, the delivery drive roller 56 continues feeding in the counterclockwise direction due to an always forward toggle. Accordingly, the media feeds through the duplex delivery nip 58 defined by the delivery drive roller 56 and an idler 59. The duplex path continues extending from the duplex delivery nip 58 to the simplex feedpath 41 near the scan feed nip 50 so that as media travels about the duplex feedpath portion 43 the media is inverted relative to the scanbar 60. Thus in a second pass by the scar bar 60 the second side of a media sheet may be scanned for duplex scan functionality. In the exemplary embodiment, with the top input 18 and bottom output 19, if proper collation of the media is desired at the output tray 19, the media must be fed through the duplex path 43 one additional pass.

Figure 3:
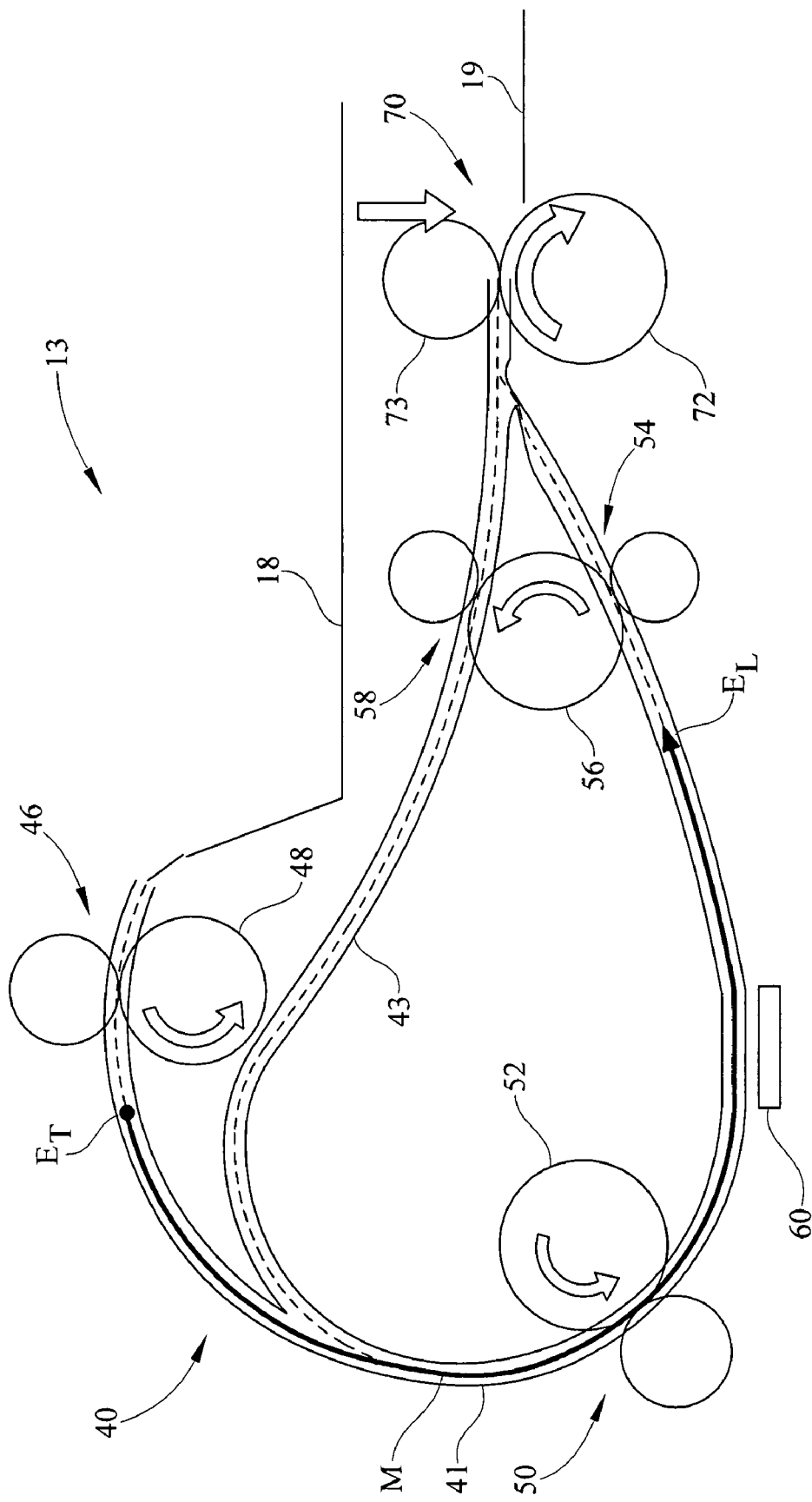
FIGS. 3-8 are sequence views of media being fed through the auto-document feeder during a duplex scanning action.

Referring now to FIGS. 3 through 8, a sequence of views depicts media M feeding through the ADF scanner 13. In FIG. 3 the media M feeds through the feed nip 46 such that the leading edge $E_L$ is positioned beyond the scan index nip 50 and scanbar 60 while the trailing edge $E_T$ of media M is just beyond the feed nip 46 in the feed direction. The drive rollers 48, 52 and 56 are all rotating in the counterclockwise direction. Oppositely, the exit drive roller 72 is rotating in a clockwise direction and the exit idler 73 is positioned against the exit drive roller 72 defining the final exit nip 70.

Figure 4:
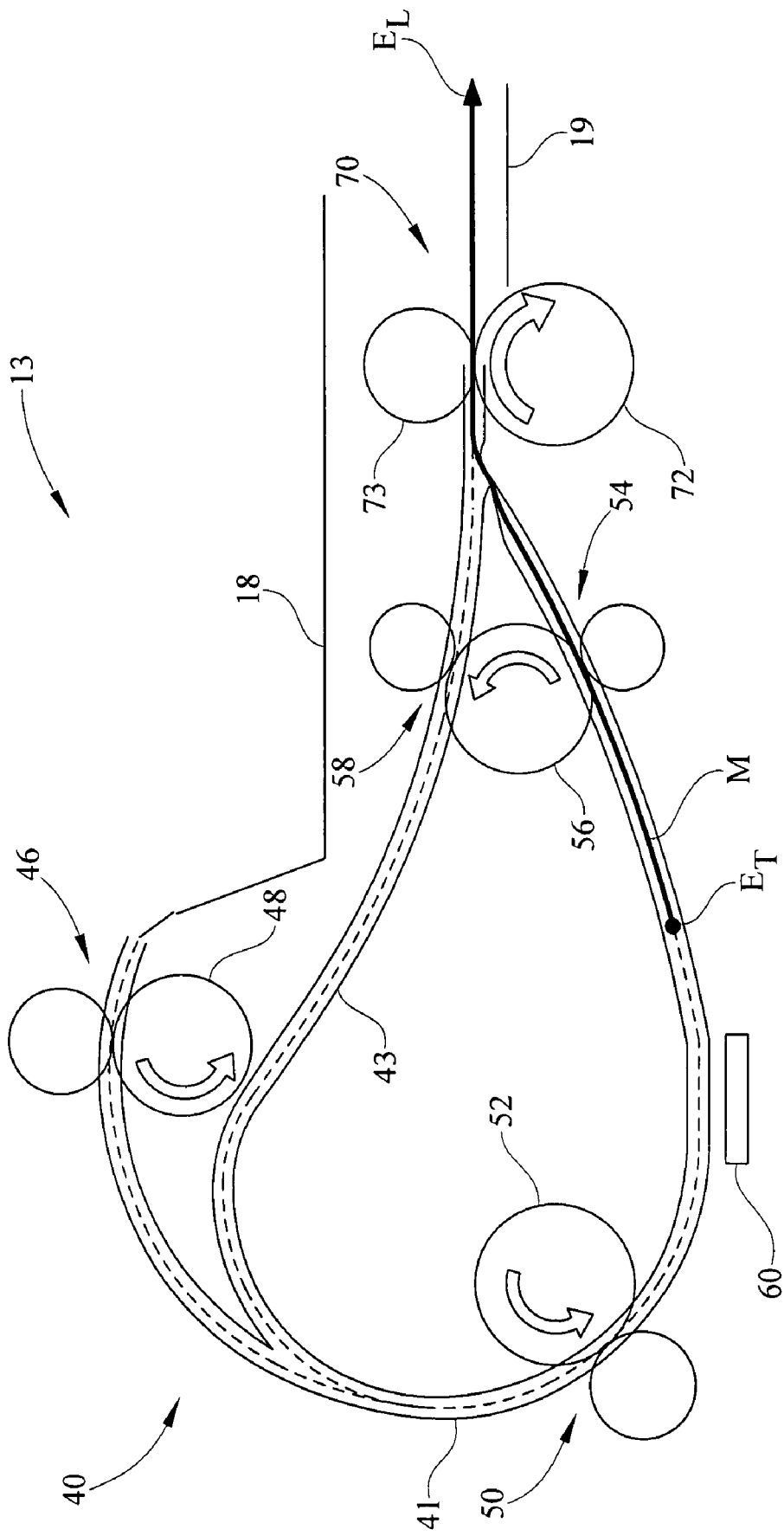

Referring now to FIG. 4, the media M leading edge $E_L$ has indexed through the final exit nip 70 and toward the output tray 19. The exit nip 70 remains in the closed position such that the exit idler 73 remains positioned against the exit drive roller 72 for feeding of the media M toward the output tray 19. Additionally the feed drive roller 48, scan feed drive roller 52 and the delivery drive roller 56 are all rotating in the counterclockwise direction while the exit drive roller continues rotating in the clockwise direction.

Figure 5:
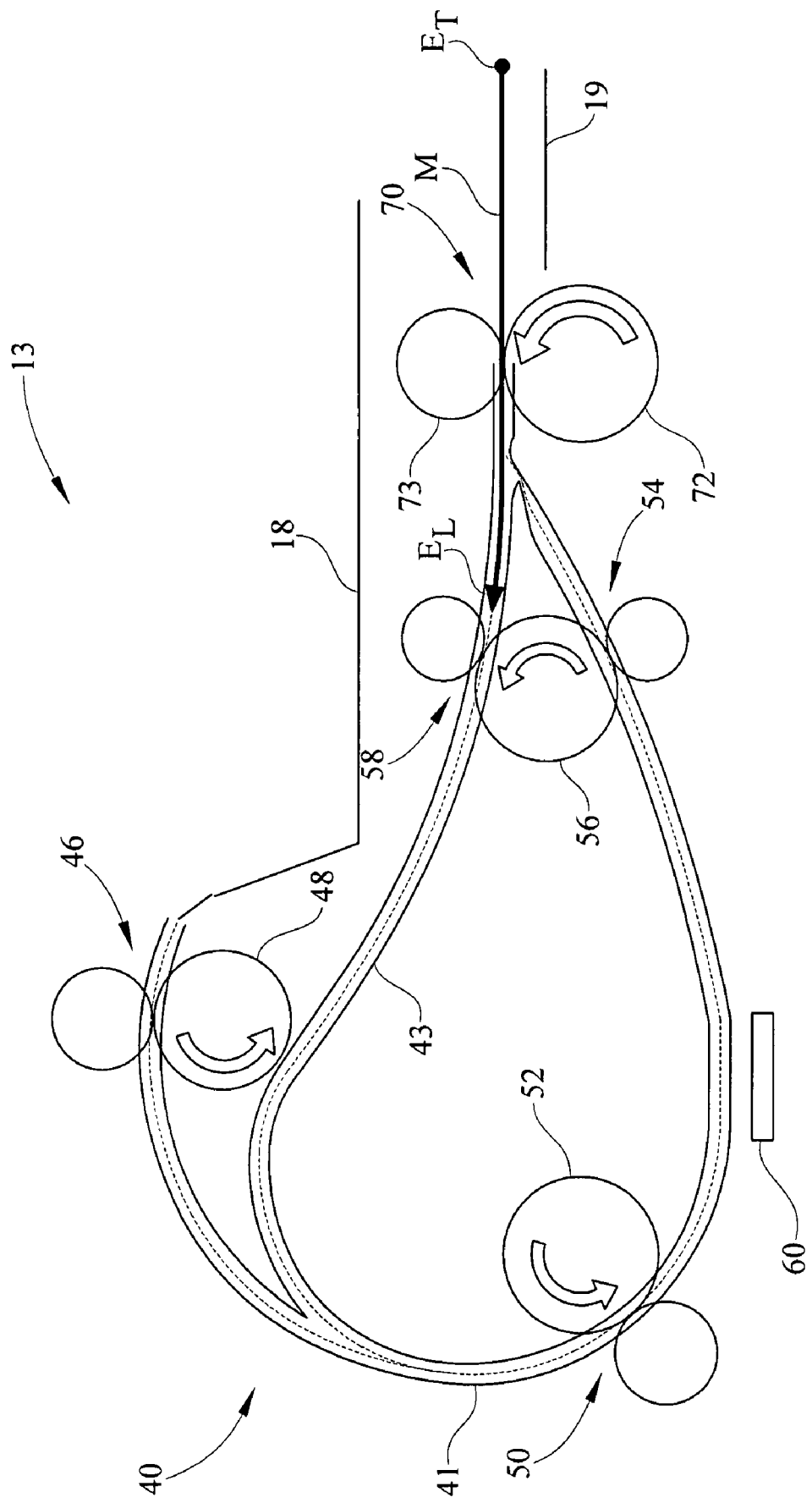

Referring now to FIG. 5, the media M has advanced through the final exit nip 70 without allowing the trailing edge $E_T$ to pass there through. The trailing edge $E_T$ must clear the intersection of simplex path 41 and duplex path 43 nearest the final exit nip 70. A sensor may be utilized to ascertain that the trailing edge $E_T$ is beyond the intersection before the motor 36 (FIG. 2) is reversed. The motor 36 is reversed so that the final exit drive roller 72 is now rotating in a counterclockwise direction. Due to an always forward toggle the index feed drive roller 52 and the delivery drive roller 56 continue their rotation in the counterclockwise direction. Since the motor 36 reversal results in the final exit roller 72 having a counterclockwise rotation the media leading edge has changed to the media trailing edge $E_T$. Likewise, the previously media trailing edge becomes the media leading edge $E_L$ and moves toward the duplex delivery nip 58.

Figure 6:
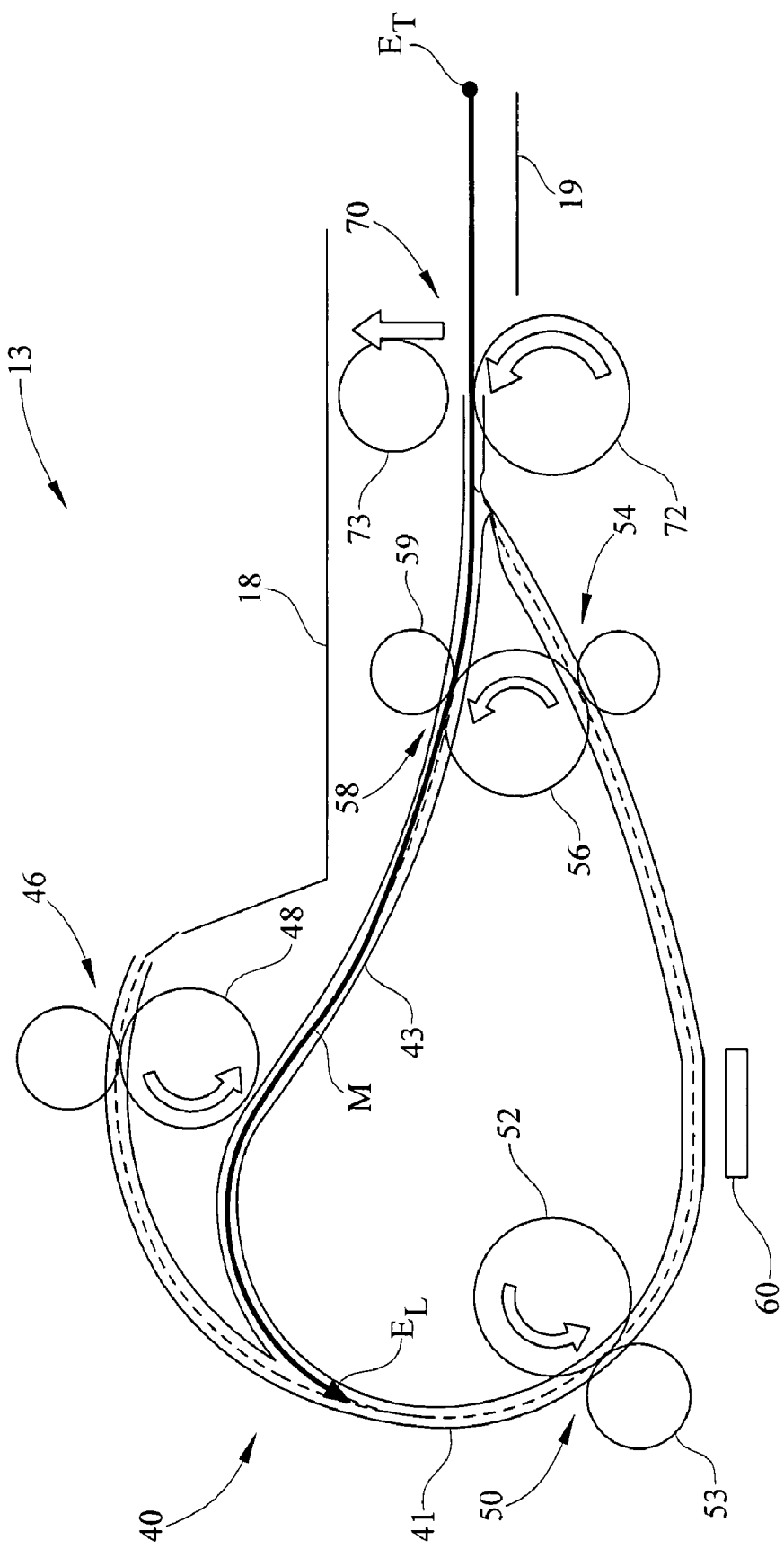

Referring now to FIG. 6 the media M is continuing to advance through the duplex feedpath portion 43 toward the scanning index nip 50. In the depicted view the leading edge $E_L$ is moving into the simplex portion 41 of the feedpath 40 while the trailing edge $E_T$ is moving from the output tray 19 into the duplex path 43. The feed drive roller 48, the indexing drive roller 52 and delivery drive roller 56 continue rotating in the counterclockwise direction. Accordingly, the duplex delivery nip 58 feeds the media toward the indexing feed nip 50. The exit idler 73 is moved away from the exit drive roller 72 thus the media M is being fed by the duplex delivery nip 58. The idler 73 is moved in the present embodiment by a cam assembly 90 (FIGS. 14, 15) and described further herein.

Figure 7:
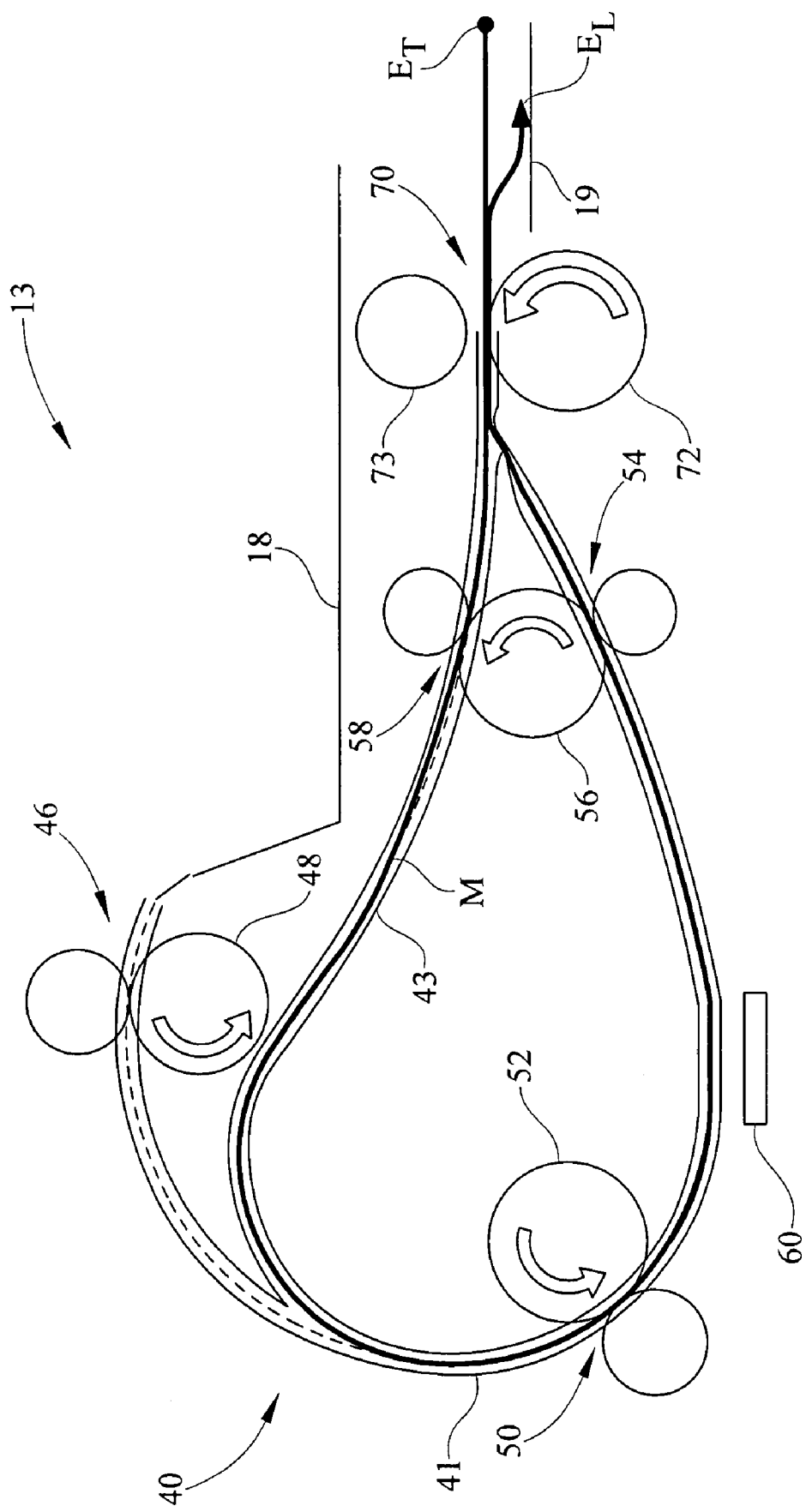

Referring now to FIG. 7 the media M continues moving through the duplex path 43 and past the scanbar 60 of feedpath 40. The leading edge $E_L$ is moved past the scanbar 60 toward the exit delivery nip 54 and the delivery drive roller 56 rotates in a counterclockwise direction to feed the media toward final exit nip 70 meanwhile the trailing edge $E_T$ is moving through the duplex feedpath portion 43. The trailing edge of the media is depicted extending through the duplex delivery nip 58 and the index feed nip 50. This occurs without causing feed inconsistencies since corresponding idlers 59 and 53 may be biased wherein the bias on idler 53 is greater than the bias on idler 59. Various biasing elements may be utilized such as leaf springs, compression springs or other such biasing elements. As a result of the greater biasing force at idler 53, the nip 50 controls indexing. The scan feed drive roller 52 is also rotating in a counterclockwise direction a long with the exit drive roller 72. As previously described the exit idler 73 is moved away from the exit drive roller 72 so that the media is not engaged by the final exit nip 70. Alternatively stated, media passes between the exit drive roller 72 and exit idler 73 without being actively engaged by either of these rollers.

Figure 8:
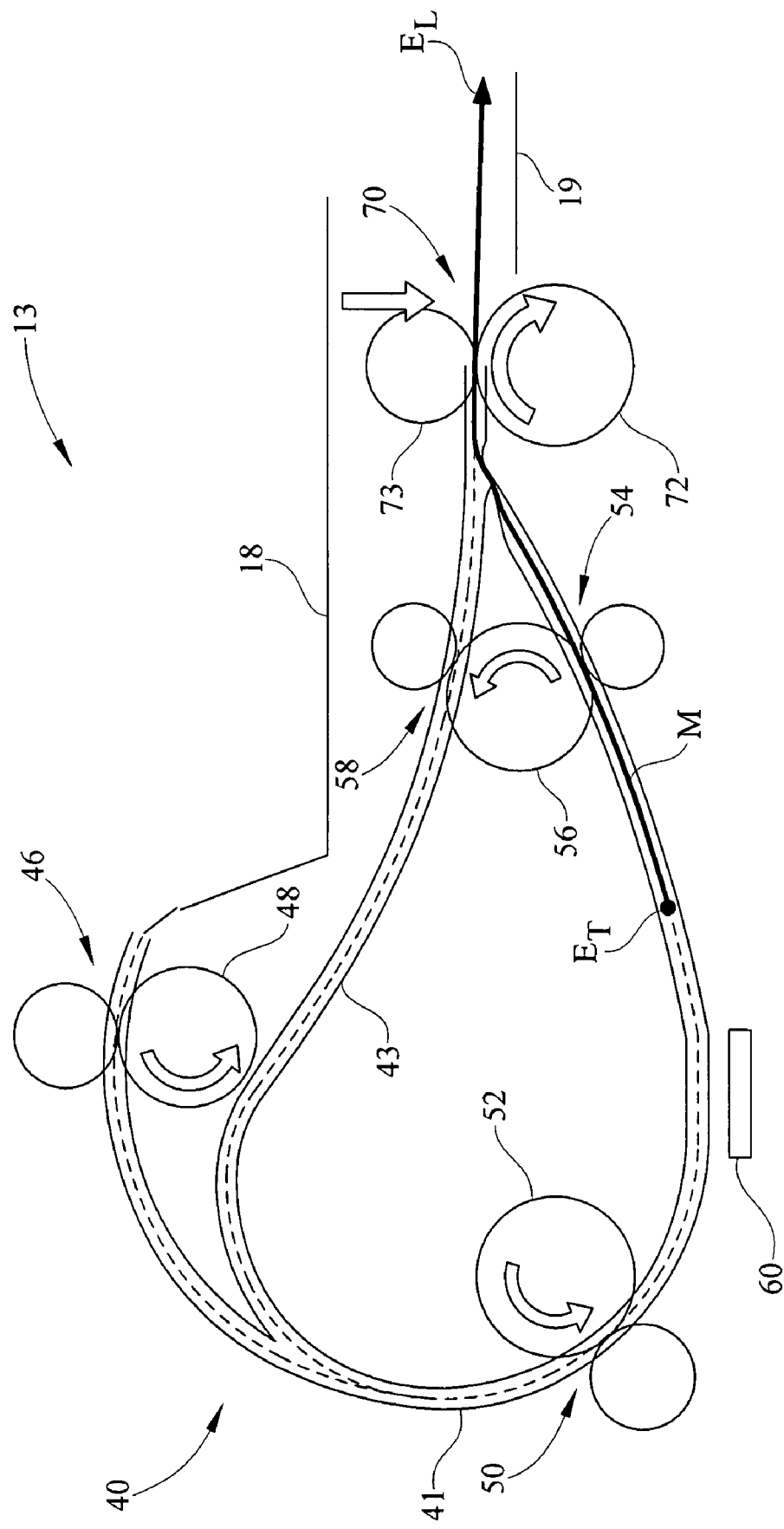

Referring now to FIG. 8 the media M continues moving from the duplex portion 43 through the simplex portion 41 past the scanbar 60. The drive rollers 52, 56 are rotating in a counterclockwise direction and the final exit drive roller 72 is rotating in a clockwise direction. In the Figure, the final exit idler 73 is moved to the closed position to engage media M for feeding through the final exit nip 70. The motor 36 (FIG. 2) is reversed after scanning is complete in order to both close the nip 70 while reducing scan defects. As a result, The leading edge $E_L$ is moving toward the output tray 19.

In Table 1 listed below, the directions of the rollers are indicated at the various stages of the media feed process previously described. Likewise, the table indicates the position of the final exit nip 70.

TABLE 1

| | Pinion | Pick Shaft (44) | Feed Roll (48) | Scan Index Roll (52) | Exit Delivery Roll (56) | Final Exit Roll (72) | Final Exit Nip (70) Status | Duplex Delivery Roll (56) | Exit Cam Shaft (94) |
|---|---|---|---|---|---|---|---|---|---|
| Mode | | CCW: Pick CW: Lift ACM | CCW: Deliver | CCW: Feed | CCW: Exit | CCW: Duplexing CW: Exiting | | CCW: Duplexing | CCW: Opens Nip CW: Closes Nip |

TABLE 1-continued

|  | Pinion | Pick Shaft (44) | Feed Roll (48) | Scan Index Roll (52) | Exit Delivery Roll (56) | Final Exit Roll (72) | Final Exit Nip (70) Status | Duplex Delivery Roll (56) | Exit Cam Shaft (94) |
|---|---|---|---|---|---|---|---|---|---|
| Pick | CW | CCW | CCW | CCW | CCW | CCW | Open | CCW | CCW |
| Index 1st Pass | CCW | CW | CCW | CCW | CCW | CW | Closed | CCW | CW |
| Exit 1st Pass | CCW | CW | CCW | CCW | CCW | CW | Closed | CCW | CW |
| Duplex A | CW | Disengaged | CCW | CCW | CCW | CCW | Closed | CCW | CCW |
| Duplex B | CW | Disengaged | CCW | CCW | CCW | CCW | Open | CCW | CCW |
| Exit Delivery 2nd Pass | CW | Disengaged | CCW | CCW | CCW | CCW | Open | CCW | CW |
| Exit 2nd Pass | CCW | CW | CCW | CCW | CCW | CW | Closed | CCW | CW |

Across the top row of Table 1 are the various shaft or roller directions at various locations along the feedpath 40. The table lists the pinion direction, which is indicative of the motor direction. Also listed are the pick shaft 44, feed roll 48, scan feed or index roll 52, exit delivery roll 56, final exit roll 72 and duplex delivery roll 56. Also indicated in Table 1 are the final exit nip status which is indicated as either opened or closed. Likewise, the exit cam shaft 94 is described by rotational direction which corresponds to either an opened position or a closed position of the final exit nip 70. Along the left-hand side of the table the various functions of the media through the feedpath 43 are listed corresponding to each of the shafts listed across the top row. For example, the pick function is listed, the index drive roll first pass, the exit roll first pass, first and second duplex phases as well as the second pass at the exit delivery and second final exit pass. Thus utilizing Table 1, one skilled in the art will learn the various rotations directions of the drive rolls at various times during the media feed process. The first duplex phase may be defined as feeding area from the exit nip 70 to nip 58 while the second duplex phase may be defined as the feeding area from the duplex delivery nip 58 to exit delivery nip 54.

In the description of the exemplary embodiment provided in FIG. 2 and shown in sequence in FIGS. 3-8, the ADF 13 provides the ability to support a more substantial range of media sizes. Such range of media size handling is not available where the opening and closing of a nip is based on gear timing rather than reversal of motor direction to actuate the nip. The present exemplary embodiment allows better control of feeding, and therefore wider range of media size for duplex feeding, by utilizing a reversing motor 36 to actuate opening and closing of a media nip.

Figure 9:
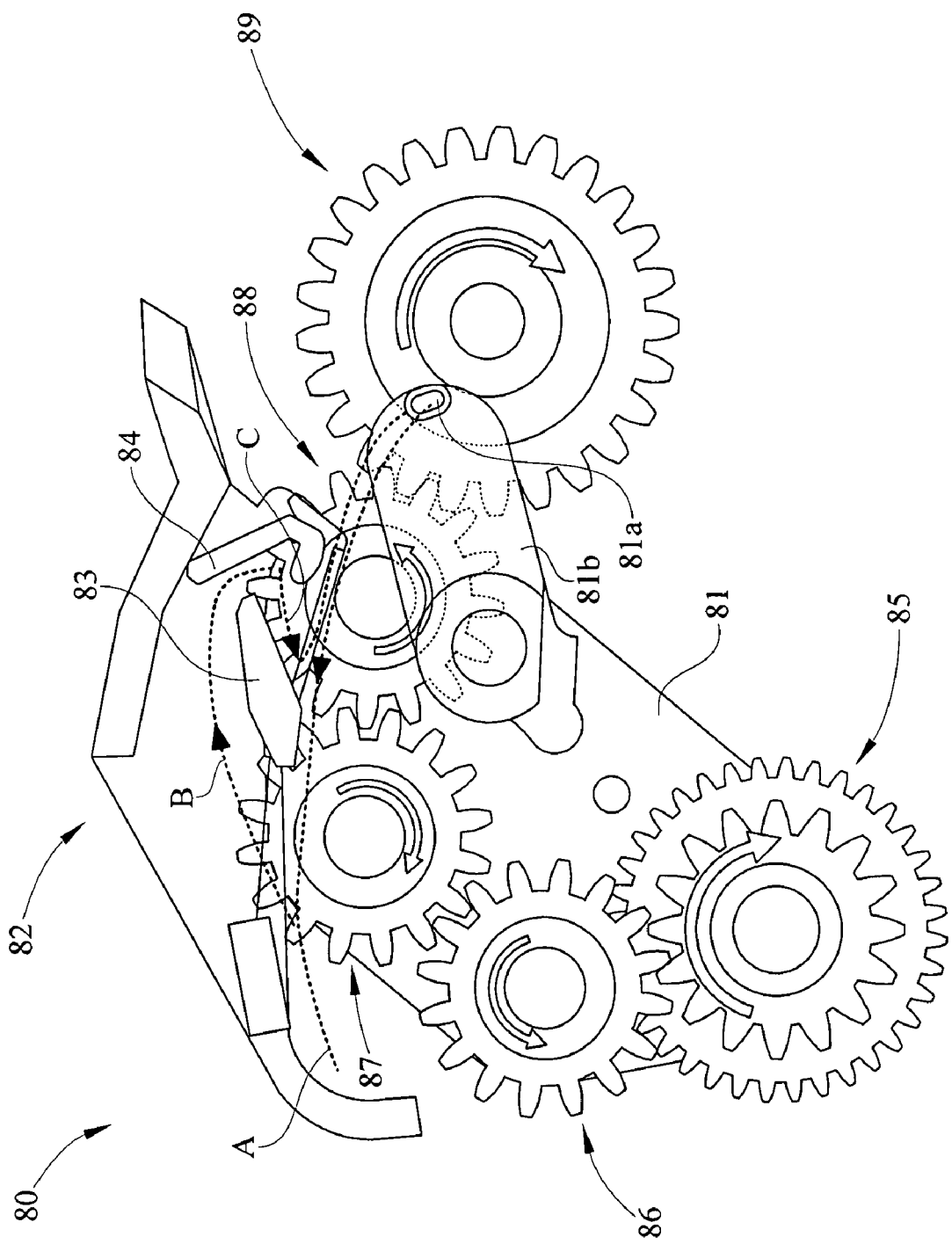
FIG. 9 is a side-view of a two-stage clutch assembly in a first, engaged position.
Figure 10:
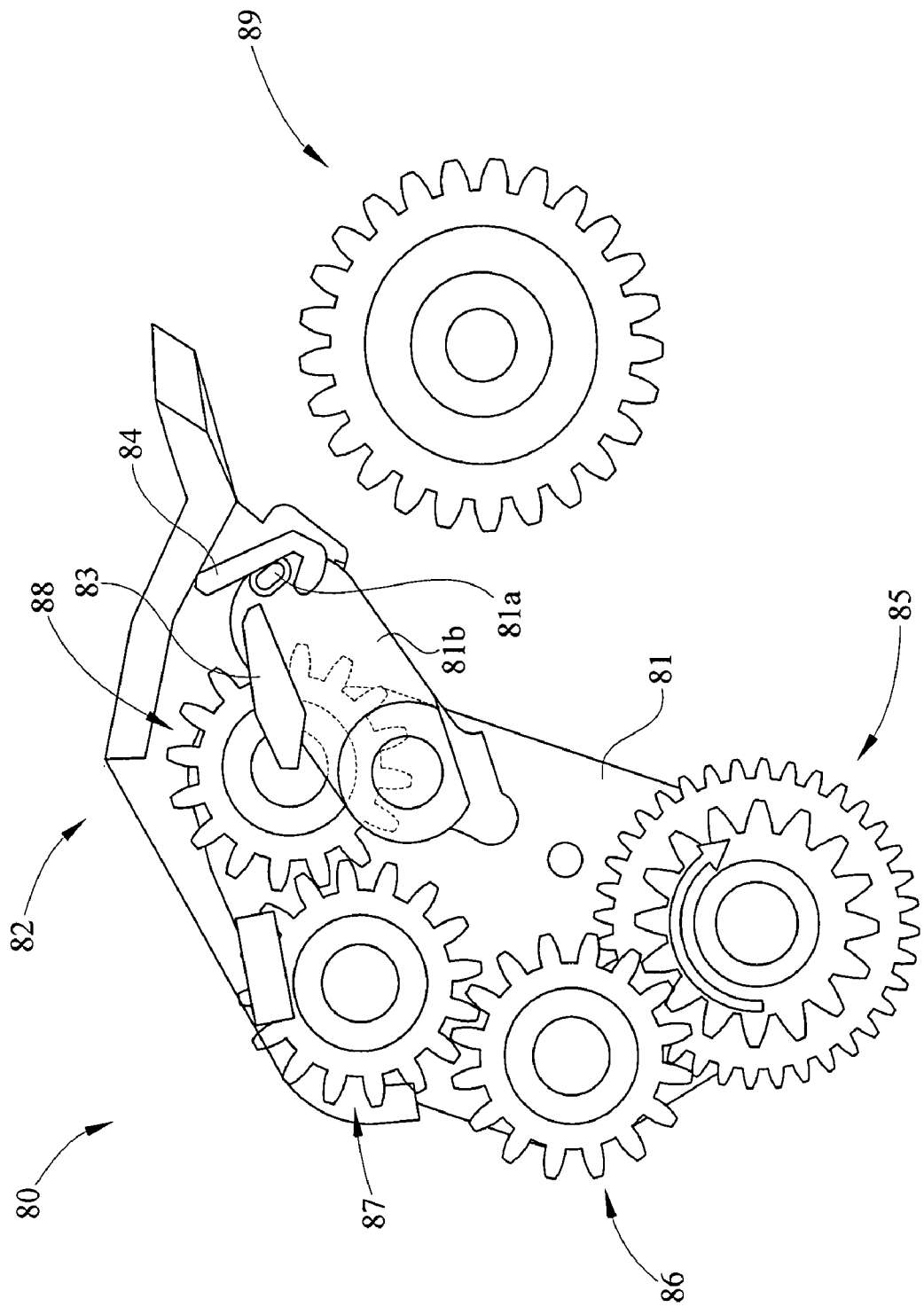
FIG. 10 is a side-view of the two-stage clutch assembly in a second, disengaged position.

Referring now to FIGS. 9 and 10, a two stage clutch assembly 80 is depicted in engaged and disengaged positions, respectively. The two stage clutch assembly 80 is depicted as moving between first and second positions to engage or disengage the media pick mechanism or ACM 42 (FIG. 2) with media M in the input tray 18. The assembly 80 comprises a clutch arm frame 81 to which a plurality of gears are rotatably connected. The clutch arm frame 81 receives input from a transmission at a compound input gear 85, which is depicted rotating in a clockwise direction. The single motor 36 (FIG. 2) driving the rollers in ADF 13 also provides the actuation for clutch arm frame 81 between the engaged and disengaged positions. The compound input gear 85 transmits torque through one or more idler gears on the clutch arm frame 81. In the depicted embodiment, a plurality of idler gears 86, 87, 88 are pivotally connected to the clutch arm frame 81 to transmit torque from the input gear 85 to a media pick mechanism input gear 89. As depicted in FIG. 9, the idler gears 86 through 88 rotate in various directions relative to the clutch arm frame 81 based on the input at compound gear 85. The most downstream idler gear 88 engages the ACM input gear 89 in the depicted position in order to drive a transmission located within the media pick mechanism or ACM 42 and ultimately drive the media pick roller 44. When the compound gear 85 is driven in the forward, clockwise direction the assembly 80 engages ACM input gear 89 and idler gear 88 transmits torque to the ACM input gear 89. Alternatively, when the compound input gear 85 is driven in the backwards, counterclockwise direction, the clutch arm assembly 80 moves away from the ACM input gear 89 along line A. The assembly 80 further comprises a pin 81a, which is connected to a pin or pawl arm 81b, which is pivotally connected to the clutch arm frame 81. The pin 81a moves with the pivoting motion of the arm 81b and the motion of the frame 81. Motion of the pin 81a is guided by a track 82 which is stationary relative to the clutch arm frame 81. The track 82 further comprises a clutch arm guide 83 and a clutch arm stop 84. When the motor 36 is reversed and the compound input gear 85 is driven in the reverse, counterclockwise direction. Pin 81a moves along broken line A with the movement of frame 81 and additionally doe to the pivotal connection of the pawl arm 81b to the frame 81 so that the idler gear 88 also moves away from the ACM input gear 89. When the motor (FIG. 2) has a change of direction to drive the compound gear 85 in the forward, clockwise direction, the pin 81a follows along broken line B of track 82 along the upper surface of the clutch arm guide 83 where the pin 81a moves into the clutch arm stop 84. This is depicted in FIG. 10 where the clutch arm assembly 80 is disengaged from the ACM input gear 89 and remains in such position until the compound input gear 85 receives a short reverse input such that the pin 81a follows broken line C and disengages the clutch arm stop 84. After the pin exits stop 81a, the pin 81a may continue along line C to reengage ACM input gear 89 or alternatively, may be reversed to move along line A and continue the disengagement of the ACM input gear 89.

Figure 11:
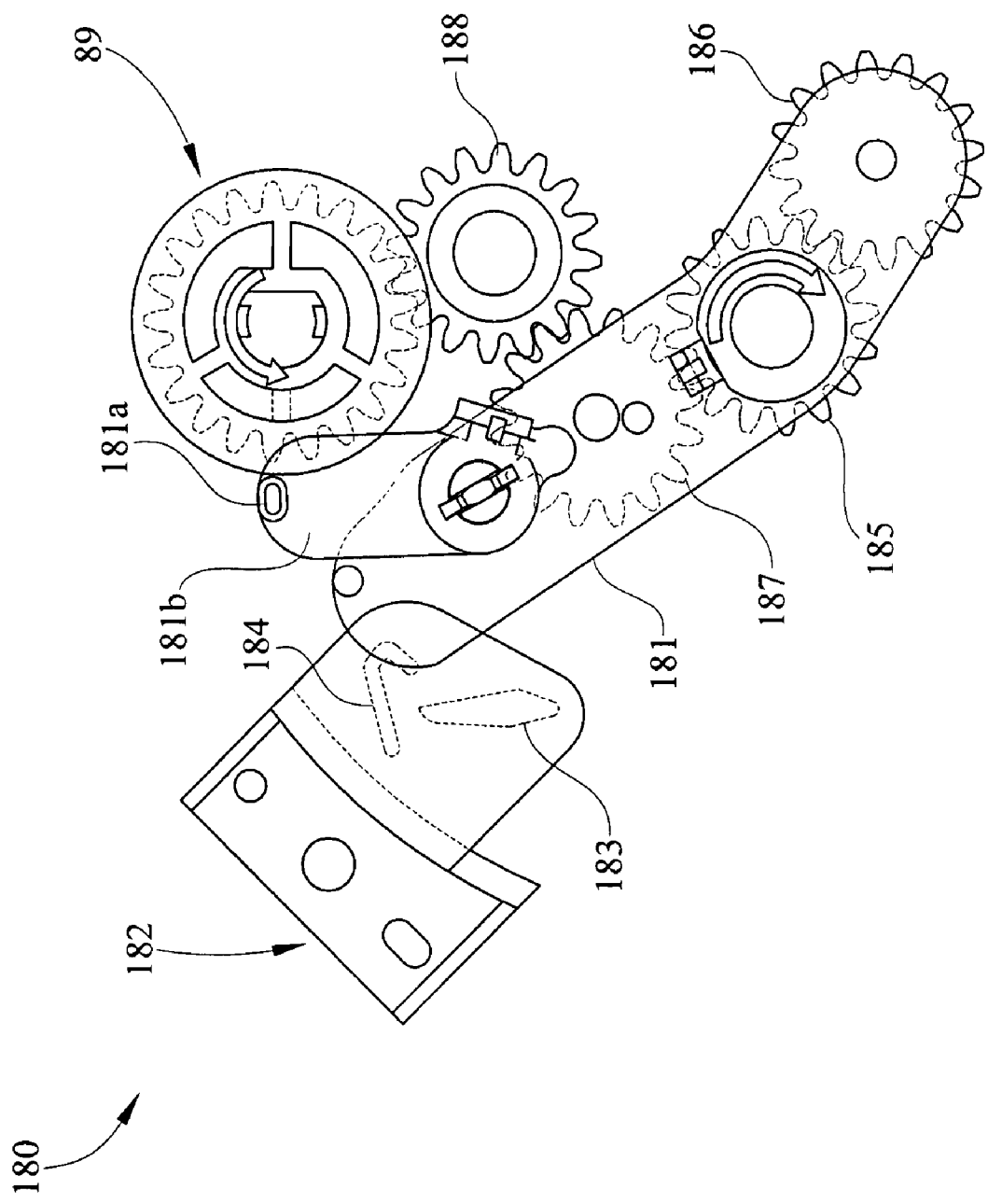
FIGS. 11-13 are a sequence of view of the movement of an alternative two-stage clutch assembly.
Figure 12:
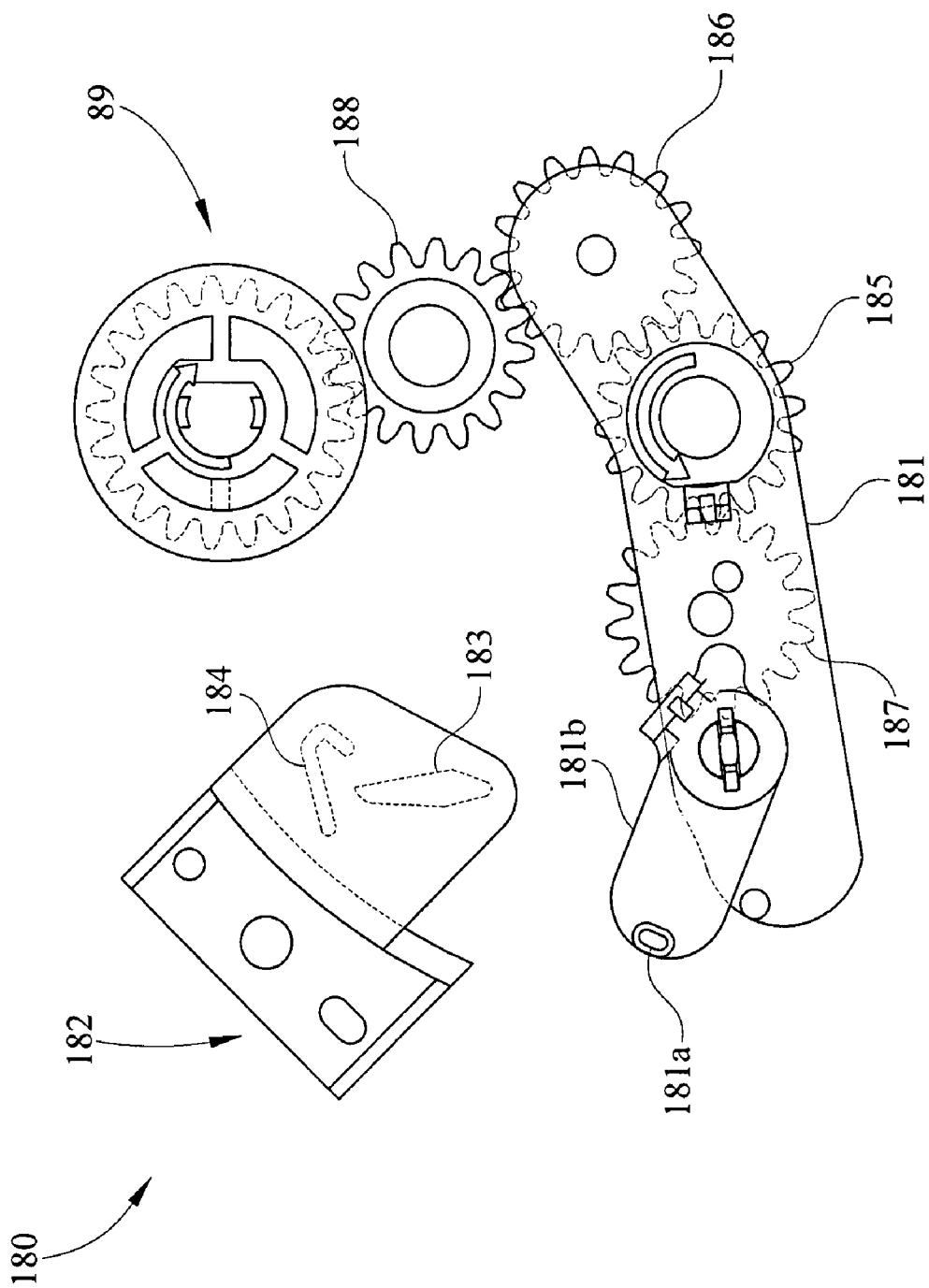
Figure 13:
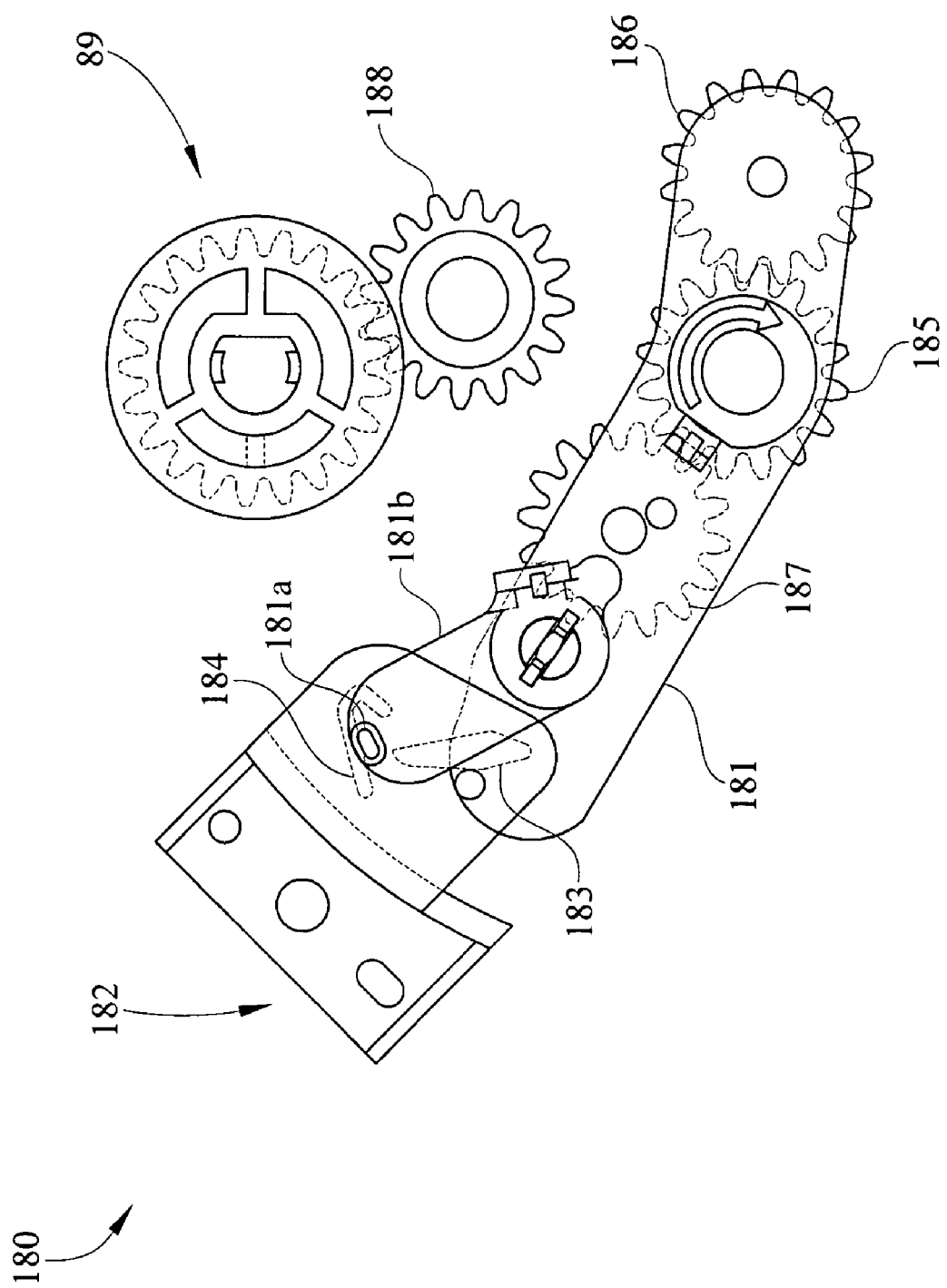

Referring now to FIGS. 11-13, a secondary alternative embodiment of a two-stage clutch assembly 180 is depicted. As shown in FIG. 9, the assembly comprises a frame 181 having an input gear 185. In the figure, the input gear is shown to rotate in a clockwise direction so as to drive idler gears 186, 187 and 188. The idler 188 is stationary relative to the frame 181 and gears 185, 186 and 187. A pin or pawl 181*a* extends from an arm 181*b* which is connected to the frame 181. The input gear 185 is reversible such that the frame 181 will rotate in a clockwise direction or a counter-clockwise direction with the rotation of gear 185. The idler 188 receives input from gears 187 or 186 depending on the rotation of the input gear 185 in order to drive an ACM input gear 89. In the embodiment of FIG. 9, the rotation of the input gear 89 is depicted in the counter-clockwise direction.

Referring now to FIG. 12, the assembly 180 is depicted in a second position. The input gear 185 has reversed to a counter-clockwise direction which causes rotation of the frame 181 about the pivot point at gear 185. As a result, idler gear 186 has moved into operable engagement with idler 188 so as to drive the ACM input gear 89 in a counter-clockwise direction. Due to the rotation of the frame 181 away from the input gear 89, the arm 181*b* and pawl 181*a* have moved away from the track 182. When the motor direction is changed again as shown in FIG. 13, the frame 181 moves toward the ACM input 89 so that the pawl 181*a* follows along an upper surface of the clutch arm guide 183 and into the clutch arm stop 184. In this position, the motor may continue to rotate causing rotation of gear 185 without having an input effect on the ACM input 89.

Although the two stage clutch assemblies 80,180 are described with respect to the ACM input gear 89, the assembly 80 may also be utilized to actuate a nip, as will be described further herein.

Figure 14:
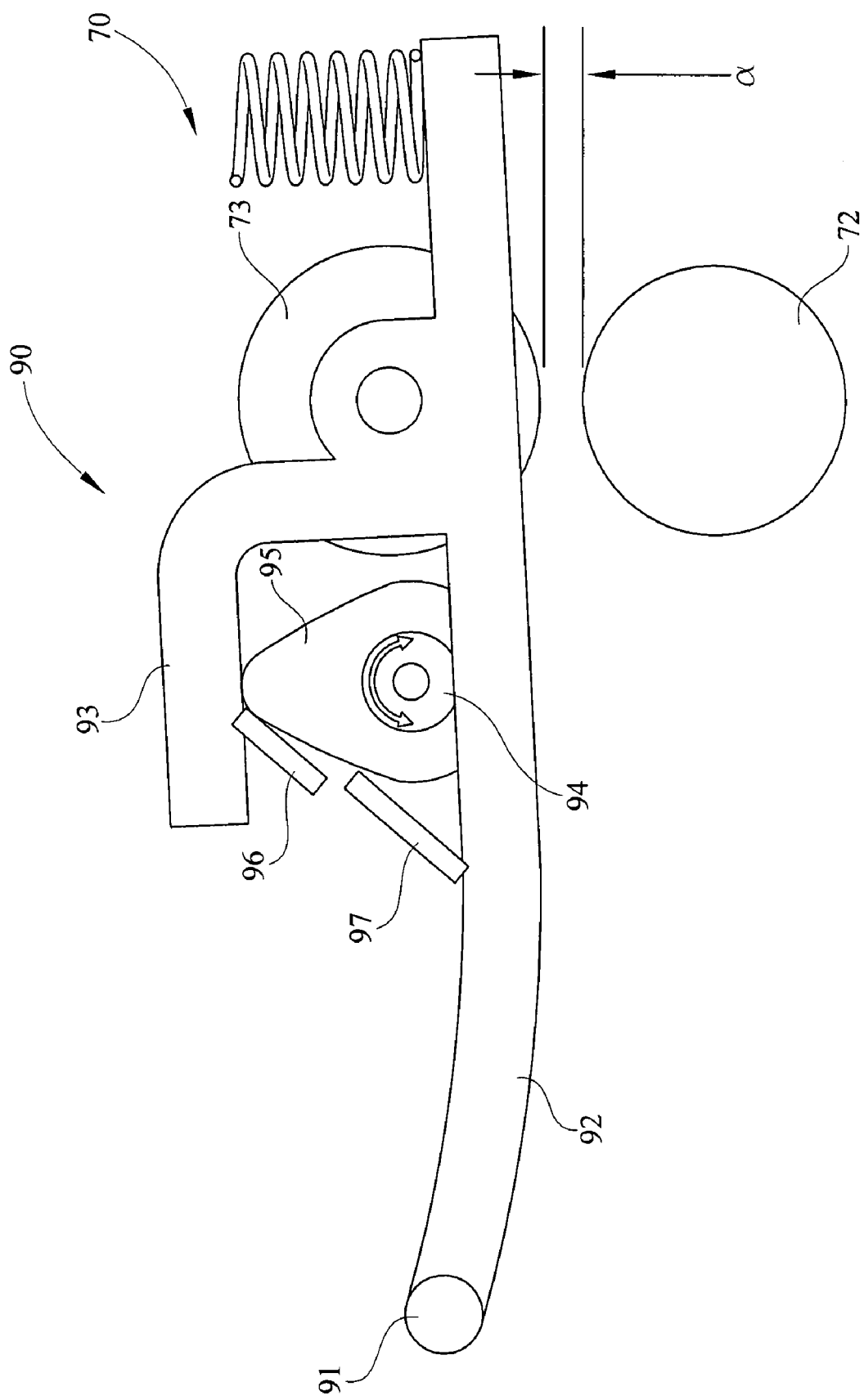
FIG. 14 is a side-view of a camming assembly operably connected to an exit nip with the exit nip shown in an open position.
Figure 15:
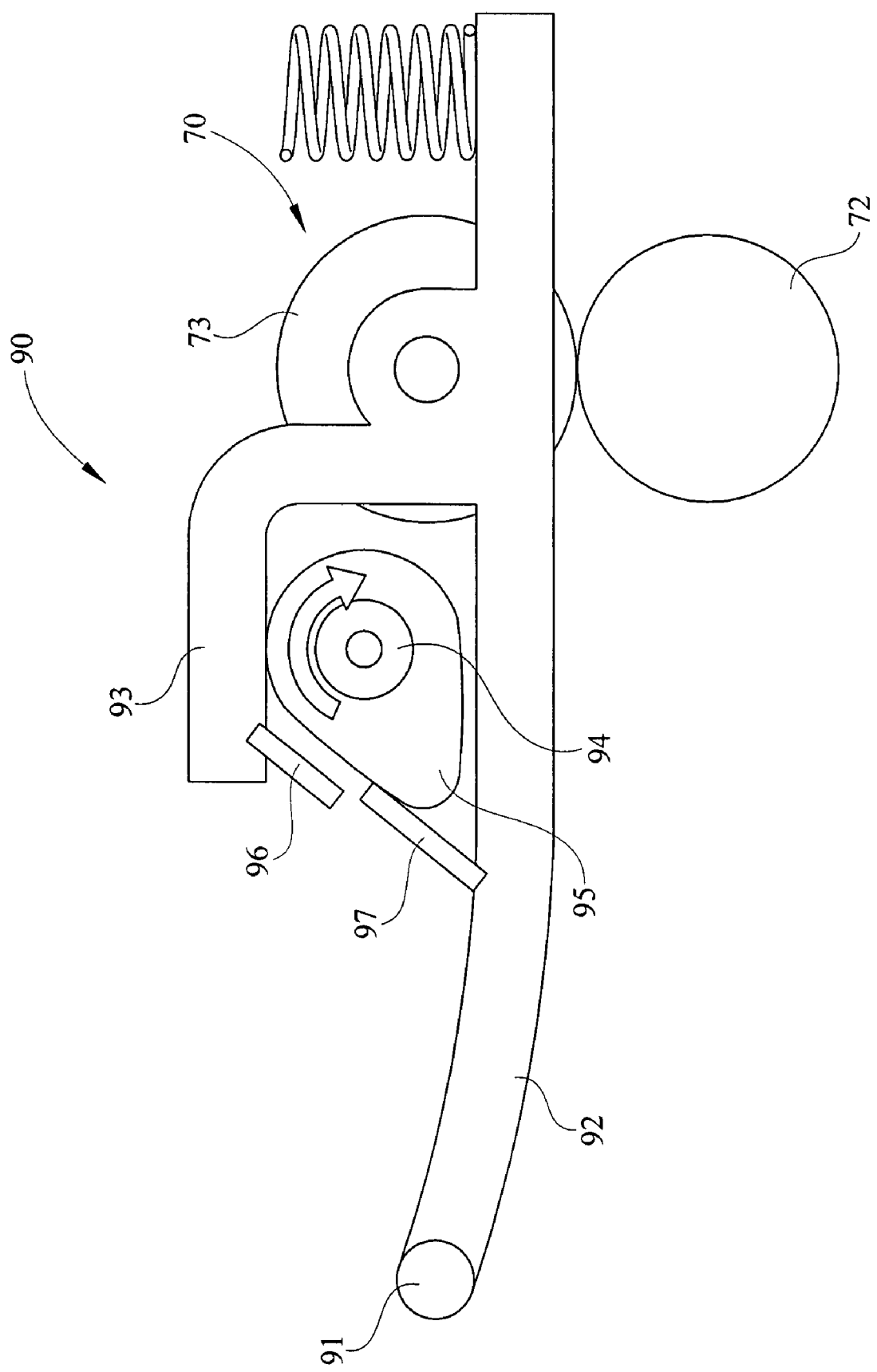
FIG. 15 is a side-view of the camming assembly of FIG. 11 with the exit nip depicted in a closed position.

Referring now to FIG. 14, the final exit nip 70 is depicted in side view. The final exit drive roll 72 is shown spaced from the final exit idler 73 in order to provide the spacing indicated by the distance α. The final exit nip 70 utilizes a camming assembly 90 comprising a pivot 91 and an arm or idler housing 92 connected at the pivot 91 to a frame or other stationary object within the ADF scanner 13. The arm 92 includes a follower 93 which connects the idler roller 73 to the cam assembly 90. A cam shaft 94 is driven by the motor 36 in order to turn a cam 95. The cam 95 has a preselected profile which engages the follower 93 to raise and lower the idler rower 73 from the driven roller 72 by a distance defined as α on FIG. 14. The cam shaft 94 may rotate about a pivot and in clockwise and counterclockwise directions. When the cam 95 is rotated in a counterclockwise direction, a first, upper stop 96 is engaged at which position the idler roller 73 is raised by the distance α. Alternatively when the cam 95 is rotated in a clockwise direction, a second, lower stop 97 is engaged, as shown in FIG. 12. Again due to the profile of the cam 95, the follower 93 is lowered by a distance α so the idler roller 73 is engaging the driven roller 72 of the final exit nip 70. The cam shaft 94 direction and relationship with the status of the final exit nip 70.

Figure 16:
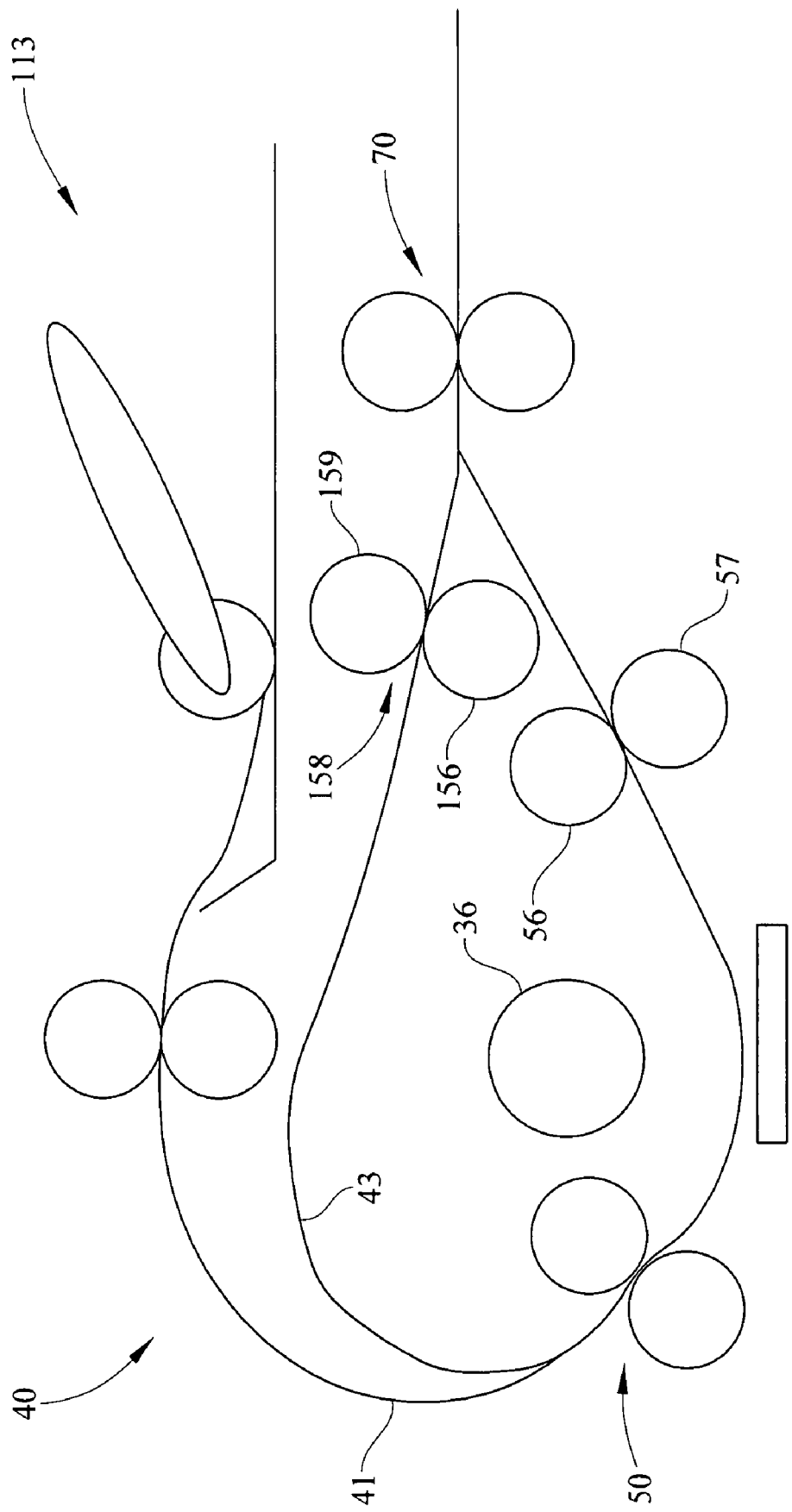
FIG. 16 is a side schematic view of an alternative embodiment of the present invention.

Referring now to FIG. 16, an alternative embodiment of the ADF feedpath of FIG. 2 as depicted in side schematic view. An ADF scanner 113 is shown with a feedpath 40 comprising a simplex portion 41 and a duplex portion 43. The alternative embodiment utilizes a duplex delivery nip 158 comprising an independent duplex delivery drive roller 156 and an idler 159. Alternatively stated, the delivery drive roller 56 and idler 57 are separate from the duplex delivery nip 158 rather than a single drive roller associated with idlers 57 and 59, as depicted in FIG. 2. A duplex delivery drive roll 156 and corresponding idler 159 define a duplex delivery nip 158 moving media through the duplex feedpath portion 43 to the index feed nip 50. Meanwhile an independent exit delivery drive roll 56 and corresponding idler 57 index the media to the final exit nip 70. Accordingly, a simple mechanism such as the cam assembly 90 described in FIGS. 14 and 15 may be utilized to open and close the final exit nip 70 and also allows for delivery of media to the exit nip 70 when the exit nip 70 is in the closed position. As with the previous embodiment, the present exemplary embodiment allows better control of feeding, and therefore wider range of media size for duplex feeding, by utilizing a reversing motor 36 to actuate opening and closing of the media nip 70.

Figure 17:
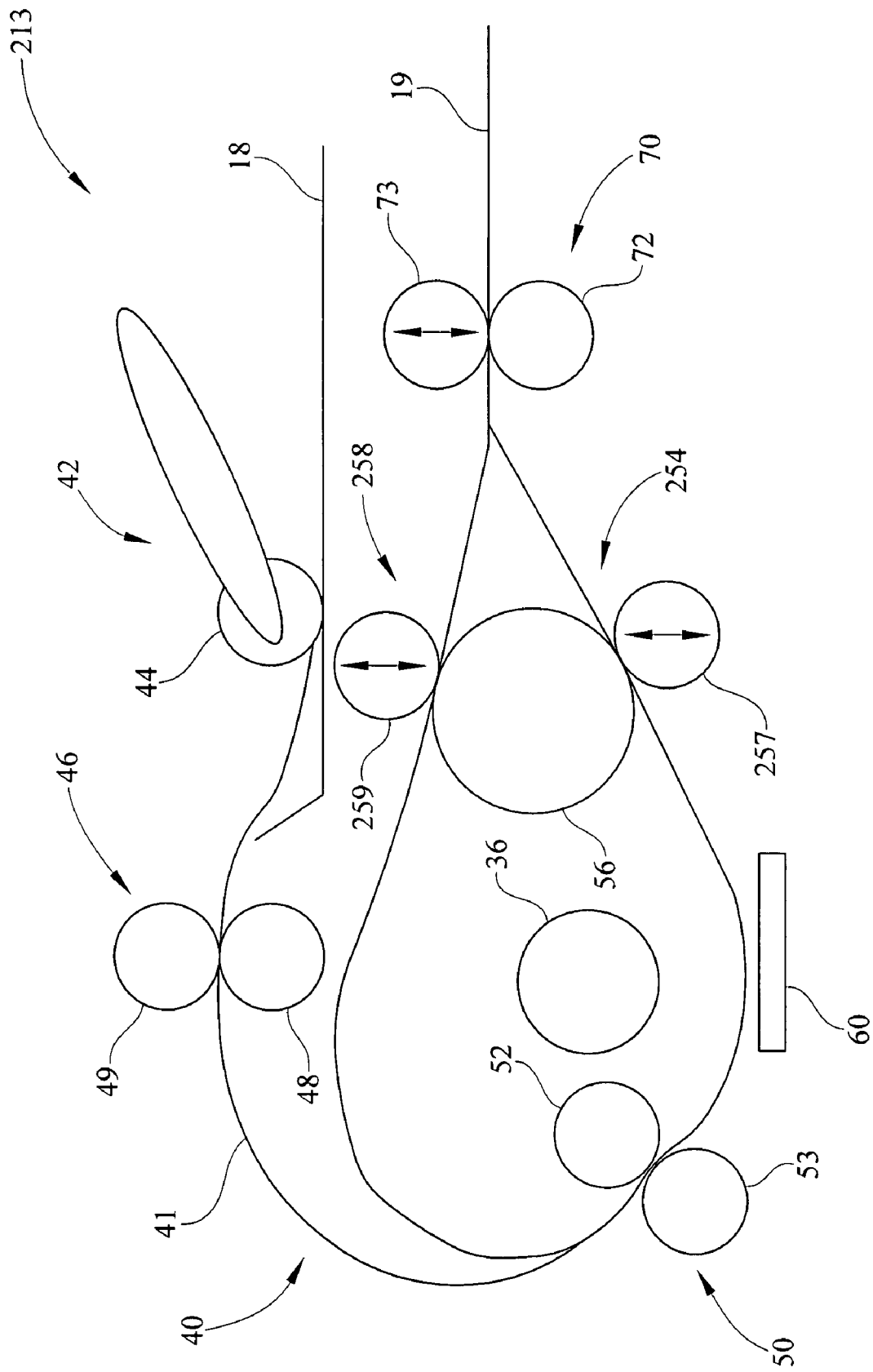
FIG. 17 is a side schematic view of a second alternative embodiment of the present invention.

Referring to FIG. 17, an additional alternative embodiment of an ADF 213 is depicted. In such embodiment, ADF 213 includes a delivery drive roller 56 and various of the components of the feedpath 40 previously described. In the depicted embodiment, a duplex idler 259 in combination with the drive roll 56 defines a duplex delivery nip 258. The drive roll 256 in combination with an exit delivery idler 257 defines an exit delivery nip 254. In the depicted embodiment, the idlers 257, 259 are each movable toward and away from the drive roll 256 in order to open and close the respective nips 254, 258. The idlers 257, 259 may be movable with a cam assembly as previously described or alternatively with a two-stage clutch assembly 80. In such embodiment, the final exit nip 70 is closed when media is received therein in the simplex feed but is opened with the leading edge and trialing edge pass through that nip during duplex feeding. Accordingly, the embodiment allows better control of feeding, and therefore wider range of media size for duplex feeding, by utilizing a reversing motor to actuate opening and closing of the media nips.

Figure 18:
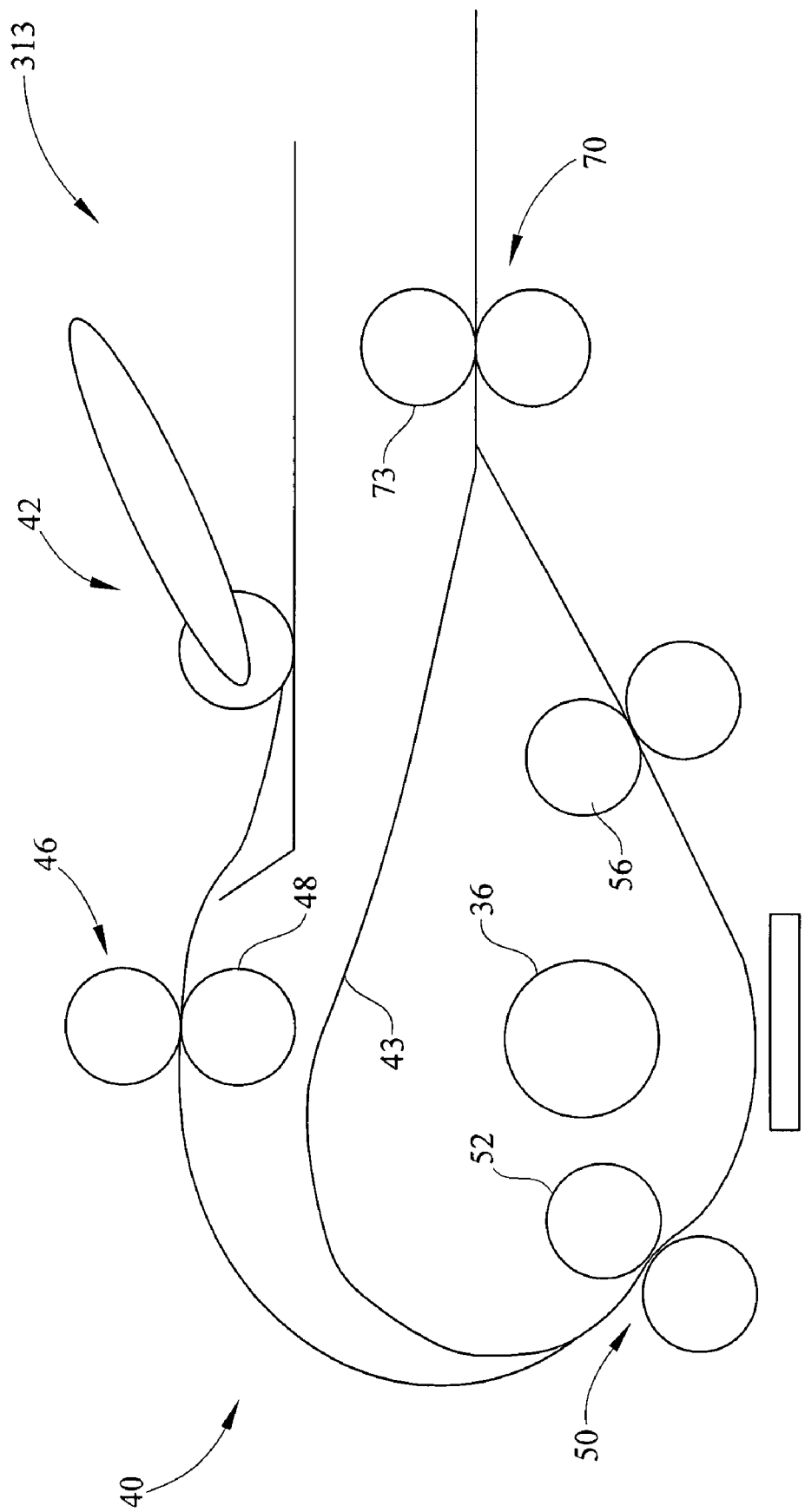
FIG. 18 is a side schematic view of a third alternative embodiment of the present invention.

Referring now to FIG. 18, a further alternative embodiment is depicted in schematic side view as ADF 313. The duplex delivery nip is removed so that media feeds through the duplexing feedpath 43 from the final exit nip 70 to the scan feed nip 50. In the embodiment depicted, the ACM 42 and the final exit idler 73 may be actuated utilizing two two-stage clutch assemblies 80 (FIG. 9) in order to accurate the corresponding rollers. However, such design still allows for the final exit nip 70 to receive media in a closed position in the simplex feed while being open when the media duplex feed occurs. Accordingly, the embodiment allows better control of feeding, and therefore wider range of media size for duplex feeding, by utilizing a reversing motor to actuate opening and closing of the media nips. As indicated below in Table 2, the motor direction is related to the various nips within feedpath 40, as well as the position, open or closed, of the final exit nip 70. According to the present exemplary embodiment comprising the two-stage clutch mechanism 80 used for each of the ACM 42 and the final exit nip 70, the motor 36 is reversed for a short duration or "jog" to close the final exit nip 70 or the motor 36 is driven forward for a short duration or "jog" in order to open the final exit nip 70. As previously described, if proper collation is further desired, steps V through IX should be repeated to deliver the media through the duplex path 43 one additional time.

TABLE 2

|  |  | Motor | | | Feed Roll (48) | Roller | | | | |
|---|---|---|---|---|---|---|---|---|---|---|
|  |  | | | | | Scan Index Roll (52) | Scan | Exit Delivery Roll (56) | Final Exit Roll (72) | Final Exit Nip (70) Status |
|  |  | Direction | Duration | ACM | | | | | | |
| Simplex | i | Reverse | Short | Engage | Short Fwd | Short Fwd | No | Short Fwd | Short Rev | Closed |
|  | ii | Fwd | Long | Pick | Fwd | Fwd | No | Fwd | Fwd | Closed |
|  | iii | Reverse | Long | Disengage | Fwd | Fwd | No | Fwd | Rev | Closed |
|  | iv | Fwd | Long | Disengage | Fwd | Fwd | Scan | Fwd | Fwd | Closed |
| Duplex | v | Reverse | Long | Disengage | Fwd | Fwd | No | Fwd | Rev | Closed |
|  | vi | Fwd | Short | Disengage | Short Fwd | Short Fwd | No | Short Fwd | Short Fwd | Open |
|  | vii | Reverse | Long | Disengage | Fwd | Fwd | Scan | Fwd | Rev | Open |
|  | viii | Fwd | Long | Disengage | Fwd | Fwd | No | Fwd | Fwd | Closed |
|  | ix | Fwd | Long | Disengage | Fwd | Fwd | No | Fwd | Fwd | Closed |

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An duplex auto-document feed mechanism, comprising:
   an auto-document feedpath having a simplex feedpath portion and a duplexing feedpath portion in feeding communication with said simplex feedpath portion;
   said auto-document feedpath having a media input and a media output; an input roller for feeding media disposed at said media input and an exit nip positioned near said media output;
   a motor driving said input roller and said exit nip; and,
   a scanning station disposed along one of said duplex feedpath portion and said simplex feedpath portion;
   said exit nip having a first position wherein first and second rollers defining said exit nip are closed when receiving media during a simplex feeding procedure and open when a leading edge and trailing edge of media are passing through said exit nip simultaneously;
   wherein a change of motor direction one of opens said exit nip or closes said exit nip.

2. The duplex auto-document feeding mechanism of claim 1 further comprising a cam assembly opening said exit nip and closing said exit nip.

3. The duplex auto-document feeding mechanism of claim 2 further comprising an idler housing, one of said first and second rollers rotatably connected to said idler housing.

4. The duplex auto-document feeding mechanism of claim 3 wherein said idler housing is pivotally connected within said auto-document feed mechanism for pivotal motion away from the other of said first and second rollers.

5. The duplex auto-document feeding mechanism of claim 1 further comprising a two-stage clutch mechanism.

6. The duplex auto-document feeding mechanism of claim 5 further comprising a frame and a pawl pivotally connect to said frame.

7. The duplex auto-document feeding mechanism of claim 6 wherein said two stage clutch assembly either engages or disengages an auto-compensating mechanism input gear based on a rotation of said motor.

8. The duplex auto-document feeding mechanism of claim 1 further comprising a delivery drive roller disposed between said scanning station and said exit nip.

9. The duplex auto-document feeding mechanism of claim 8 further comprising two two-stage clutches to actuate said input roller and said exit nip.

10. The duplex auto-document feeding mechanism of claim 9 further comprising multiple jogs to actuate said two two-stage clutches.

11. A duplex feed mechanism, comprising:
    an auto-document feedpath having an input, an output, a simplex portion and a duplex portion;
    a motor driving a plurality of rollers within said auto-document feedpath;
    said plurality of rollers including an exit nip roll and a corresponding exit nip idler, the exit nip roll and exit nip idler being disposed adjacent an end of the auto-document feedpath;
    one of said exit nip rollers having a first position wherein said nip is substantially closed and a second position where said nip is open;
    said exit nip idler being movable by a cam;
    said cam being actuated by changing direction of said motor;
    a duplex delivery nip disposed within said duplex portion of said auto-document feedpath; and
    a drive roller in feeding cooperation with a duplex delivery idler at a first location and an exit delivery idler at a second location, the duplex delivery idler being moveable from a first position engaging said drive roller to a second position disengaged from said drive roller.

12. A duplex feed mechanism, comprising:
    an auto-document feedpath having an input, an output, a simplex portion and a duplex portion;
    a motor driving a plurality of rollers within said auto-document feedpath;
    said plurality of rollers including an exit nip roll and a corresponding exit nip idler, the exit nip roll and exit nip idler being disposed adjacent an end of the auto-document feedpath;
    one of said exit nip rollers having a first position wherein said nip is substantially closed and a second position where said nip is open;

said exit nip idler being movable by a cam;
said cam being actuated by changing direction of said motor;
a duplex delivery nip disposed within said duplex portion of said auto-document feedpath; and
a drive roller in feeding cooperation with a duplex delivery idler at a first location and an exit delivery idler at a second location, the duplex delivery idler being moveable by a cam assembly from a first position engaging said drive roller to a second position disengaged from said drive roller.

13. A duplex feed mechanism comprising:
an auto-document feedpath having an input, an output, a simplex portion and a duplex portion;
a motor driving a plurality of rollers within said auto-document feedpath;
said plurality of rollers including an exit nip roll and a corresponding exit nip idler, the exit nip roll and exit nip idler being disposed adjacent an end of the auto-document feedpath;
one of said exit nip rollers having a first position wherein said nip is substantially closed and a second position where said nip is open;
said exit nip idler being movable by a cam;
said cam being actuated by changing direction of said motor;
a duplex delivery nip disposed within said duplex portion of said auto-document feedpath; and
a drive roller in feeding cooperation with a duplex delivery idler at a first location and an exit delivery idler at a second location, the duplex delivery idler being moveable by a cam assembly from a first position engaging said drive roller to a second position disengaged from said drive roller, and
the duplex delivery idler being moved by a two-stage clutch mechanism.

14. A duplex auto-document feed mechanism comprising:
an auto-document feedpath including a first simplex portion and a second duplex portion;
an exit nip disposed adjacent an end of the auto-document feedpath having a first roller and a second roller;
one of said first roller and said second roller moveable from a first position to a second position during a direction change of a motor;
said duplex feedpath being shorter than a length of media so that said first and second rollers are spaced apart when a leading edge and a trailing edge are positioned within said exit nip;
wherein said first and second rollers are closed when receiving media from a simplex media feed and open during a duplex media feed; and
a two-stage clutch mechanism for actuating a pick mechanism.

* * * * *